United States Patent
Adderton et al.

(10) Patent No.: US 7,204,131 B2
(45) Date of Patent: Apr. 17, 2007

(54) DYNAMIC ACTIVATION FOR AN ATOMIC FORCE MICROSCOPE AND METHOD OF USE THEREOF

(75) Inventors: Dennis M. Adderton, Santa Barbara, CA (US); Stephen C. Minne, Danville, IL (US)

(73) Assignee: Veeco Instruments Inc., Woodbury, NY (US)

( * ) Notice: Subject to any disclaimer, the term of this patent is extended or adjusted under 35 U.S.C. 154(b) by 0 days.

(21) Appl. No.: 11/415,602

(22) Filed: May 2, 2006

(65) Prior Publication Data

US 2006/0191329 A1  Aug. 31, 2006

Related U.S. Application Data

(60) Division of application No. 10/752,235, filed on Jan. 6, 2004, now Pat. No. 7,036,357, which is a division of application No. 09/904,913, filed on Jul. 13, 2001, now Pat. No. 6,672,144, which is a continuation-in-part of application No. 09/476,163, filed on Dec. 30, 1999, now Pat. No. 6,530,266, which is a continuation-in-part of application No. 09/280,160, filed on Mar. 29, 1999, now Pat. No. 6,189,374.

(51) Int. Cl.
    *G01B 5/28*     (2006.01)
    *G01N 13/16*    (2006.01)

(52) U.S. Cl. ..................................... 73/105
(58) Field of Classification Search .................. 73/105; 250/306, 307
    See application file for complete search history.

(56) References Cited

U.S. PATENT DOCUMENTS

| | | | |
|---|---|---|---|
| 5,266,801 A | 11/1993 | Elings et al. | |
| RE34,489 E | 12/1993 | Hansma et al. | |
| 5,412,980 A | 5/1995 | Elings et al. | |
| 5,415,027 A | 5/1995 | Elings et al. | |
| 5,436,448 A | 7/1995 | Hosaka et al. | |
| 5,519,212 A | 5/1996 | Elings et al. | |
| 5,631,410 A | 5/1997 | Kitamura | 73/105 |
| 5,883,705 A | 3/1999 | Minne et al. | |
| 5,939,715 A | 8/1999 | Kitamura et al. | 250/234 |
| 5,955,660 A | 9/1999 | Honma | 73/105 |
| 5,965,881 A | 10/1999 | Morimoto et al. | |
| 6,005,246 A | 12/1999 | Kitamura et al. | 250/306 |

(Continued)

OTHER PUBLICATIONS

Atomic Force Microscopy For High Speed Imaging Using Cantilevers With An Integrated Actuator and Sensor, S.R. Manalis, S.C. Minne, C.F. Quate, *Appl. Phys. Lett.* 68(6), Feb. 5, 1996, pp. 871-873.

(Continued)

*Primary Examiner*—Daniel S. Larkin
(74) *Attorney, Agent, or Firm*—Boyle Fredrickson Newholm Stein & Gratz S.C.

(57) ABSTRACT

A scanning probe microscope method and apparatus that modifies imaging dynamics using an active drive technique to optimize the bandwidth of amplitude detection. The deflection is preferably measured by an optical detection system including a laser and a photodetector, which measures cantilever deflection by an optical beam bounce technique or another conventional technique. The detected deflection of the cantilever is subsequently demodulated to give a signal proportional to the amplitude of oscillation of the cantilever, which is thereafter used to drive the cantilever.

4 Claims, 12 Drawing Sheets

U.S. PATENT DOCUMENTS

| | | |
|---|---|---|
| 6,038,916 A | 3/2000 | Cleveland et al. |
| 6,169,281 B1 | 1/2001 | Chen et al. |
| 6,189,374 B1 | 2/2001 | Adderton et al. ............ 73/105 |
| 6,530,266 B1 | 3/2003 | Adderton et al. ............ 73/105 |
| 6,672,144 B2 | 1/2004 | Adderton et al. ............ 73/105 |

OTHER PUBLICATIONS

Regulation Of A Microcantilever Response By Force Feedback, J. Mertz, O. Marti, J. Mlynek, *Appl. Phys. Lett. 62* (19), May 10, 1993, pp. 2344-2346.

Dual Integrated Actuators For Extended Range High Speed Atomic Force Microscopy, T. Sulchek, et al. *1999 American Institute of Physics*, vol. 75, No. 11, Sep. 13, 1999 pp. 1637-1639.

DYNAMIC ACTIVATION FOR AN ATOMIC FORCE MICROSCOPE AND METHOD OF USE THEREOF

CROSS-REFERENCE TO A RELATED APPLICATION

The present application is a divisional of U.S. patent application Ser. No. 10/752,235, filed Jan. 6, 2004 now U.S. Pat. No. 7,036,357 which is a divisional of U.S. patent application Ser. No. 09/904,913, filed on Jul. 13, 2001, entitled DYNAMIC ACTIVTION FOR AN ATOMIC FORCE MICROSCOPE AND METHOD OF USE THEREOF, issued as U.S. Pat. No. 6,672,144, which is a continuation-in-part of U.S. patent application Ser. No. 09/476,163, filed on Dec. 30, 1999, which is a continuation in-part of U.S. patent application Ser. No. 09/280,160, filed on Mar. 29, 1999, both of these latter applications entitled ACTIVE PROBE FOR AN ATOMIC FORCE MICROSCOPE AND METHOD OF USE THEREOF, and now issued as U.S. Pat. Nos. 6,530,266 and 6,189,374, respectively, and each of which is expressly incorporated by reference herein.

BACKGROUND OF THE INVENTION

1. Field of the Invention

The present invention relates to atomic force microscopes (AFMs) and, more particularly, to an AFM and method of use thereof that dynamically controls the oscillating drive signal to the cantilever based on the amplitude of the measured response of the cantilever.

2. Description of the Related Art

An Atomic Force Microscope ("AFM"), as described in U.S. Pat. No. RE 34,489 to Hansma et al. ("Hansma"), is a type of scanning probe microscope ("SPM"). AFMs are high-resolution surface measuring instruments. Two general types of AFMs include contact mode (also known as repulsive mode) AFMs, and cyclical mode AFMs (periodically referred to herein as TappingMode™ AFMs.)

The contact mode AFM is described in detail in Hansma. Generally, the contact mode AFM is characterized by a probe having a bendable cantilever and a tip. The AFM operates by placing the tip directly on a sample surface and then scanning the surface laterally. When scanning, the cantilever bends in response to sample surface height variations, which are then monitored by an AFM deflection detection system to map the sample surface. The deflection detection system of such contact mode AFMs is typically an optical beam system, as described in Hansma.

Typically, the height of the fixed end of the cantilever relative to the sample surface is adjusted with feedback signals that operate to maintain a predetermined amount of cantilever bending during lateral scanning. This predetermined amount of cantilever bending has a desired value, called the setpoint. Typically, a reference signal for producing the setpoint amount of cantilever bending is applied to one input of a feedback loop. By applying the feedback signals generated by the feedback loop to an actuator within the system, and therefore adjusting the relative height between the cantilever and the sample, cantilever deflection can be kept constant at the setpoint value. By plotting the adjustment amount (as obtained by monitoring the feedback signals applied to maintain cantilever bending at the setpoint value) versus lateral position of the cantilever tip, a map of the sample surface can be created.

The second general category of AFMs, i.e., cyclical mode or TappingMode™ AFMs, utilize oscillation of a cantilever to, among other things, reduce the forces exerted on a sample during scanning. In contrast to contact mode AFMs, the probe tip in cyclical mode makes contact with the sample surface or otherwise interacts with it only intermittently as the tip is scanned across the surface. Cyclical mode AFMs are described in U.S. Pat. Nos. 5,226,801, 5,412,980 and 5,415,027 by Elings et al.

In U.S. Pat. No. 5,412,980, a cyclical mode AFM is disclosed in which a probe is oscillated at or near a resonant frequency of the cantilever. When imaging in cyclical mode, there is a desired tip oscillation amplitude associated with the particular cantilever used, similar to the desired amount of cantilever deflection in contact mode. This desired amplitude of cantilever oscillation is typically kept constant at a desired setpoint value. In operation, this is accomplished through the use of a feedback loop having a setpoint input for receiving a signal corresponding to the desired amplitude of oscillation. The feedback circuit servos the vertical position of either the cantilever mount or the sample by applying a feedback control signal to a Z actuator so as to cause the probe to follow the topography of the sample surface.

Typically, the tip's oscillation amplitude is set to be greater than 20 nm peak-to-peak to maintain the energy in the cantilever arm at a much higher value than the energy that the cantilever loses in each cycle by striking or otherwise interacting with the sample surface. This provides the added benefit of preventing the probe tip from sticking to the sample surface. Ultimately, to obtain sample height data, cyclical mode AFMs monitor the Z actuator feedback control signal that is produced to maintain the established setpoint. A detected change in the oscillation amplitude of the tip and a resulting feedback control signal are indicative of a particular surface topography characteristic. By plotting these changes versus the lateral position of the cantilever, a map of the surface of the sample can be generated.

Notably, AFMs have become accepted as a useful metrology tool in manufacturing environments in the integrated circuit and data storage industries. A limiting factor to the more extensive use of the AFM is the limited throughput per machine due to the slow imaging rates of AFMs relative to competing technologies. Although it is often desirable to use an AFM to measure surface topography of a sample, the speed of the AFM is typically far too slow for production applications. For instance, in most cases, AFM technology requires numerous machines to keep pace with typical production rates. As a result, using AFM technology for surface measurement typically yields a system that has a high cost per measurement. A number of factors are responsible for these drawbacks associated with AFM technology, and they are discussed generally below.

AFM imaging, in essence, typically is a mechanical measurement of the surface topography of a sample such that the bandwidth limits of the measurement are mechanical ones. An image is constructed from a raster scan of the probe over the area to be imaged. In both contact and cyclical mode, the tip of the probe is caused to scan across the sample surface at a velocity equal to the product of the scan size and the scan frequency. As discussed previously, the height of the fixed end of the cantilever relative to the sample surface can be adjusted during scanning at a rate typically much greater than the scanning rate in order to maintain a constant force (contact mode) or oscillation amplitude (cyclical mode) relative to the sample surface.

Notably, the bandwidth requirement for a particular application of a selected cantilever is generally predetermined.

Therefore, keeping in mind that the bandwidth of the height adjustment (hereinafter referred to as the Z axis or Z-position bandwidth) is dependent upon the tip velocity as well as the sample topography, the required Z-position bandwidth typically limits the maximum scan rate for a given sample topography.

Further, the bandwidth of the AFM in these feedback systems is usually lower than the open loop bandwidth of any one component of the system. In particular, as the 3 dB roll-off frequency of any component is approached, the phase of the response is retarded significantly before any loss in amplitude response. The frequency at which the total phase lag of all the components in the system is large enough for the loop to be unstable is the ultimate bandwidth limit of the loop. When designing an AFM, although the component of the loop which exhibits the lowest response bandwidth typically demands the focus of design improvements, reducing the phase lag in any part of the loop will typically increase the bandwidth of the AFM as a whole.

With particular reference to the contact mode AFM, the bandwidth of the cantilever deflection detection apparatus is limited by a mechanical resonance of the cantilever due to the tip's interaction with the sample. This bandwidth increases with the stiffness of the cantilever. Notably, this stiffness can be made high enough such that the mechanical resonance of the cantilever is not a limiting factor on the bandwidth of the deflection detection apparatus, even though sensitivity to increased imaging forces may be compromised.

Nevertheless, in contact mode, the Z position actuator still limits the Z-position bandwidth. Notably, Z position actuators for AFMs are typically piezo-tube or piezo-stack actuators which are selected for their large dynamic range and high sensitivity. Such devices generally have a mechanical resonance far below that of the AFM cantilever brought in contact with the sample, typically around 1 kHz, thus limiting the Z-position bandwidth.

Manalis et al. (Manalis, Minne, and Quate, "Atomic force microscopy for high speed imaging using cantilevers with an integrated actuator and sensor," Appl. Phys. Lett., 68 (6) 871–3 (1996)) demonstrated that contact mode imaging can be accelerated by incorporating the Z position actuator into the cantilever beam. A piezoelectric film such as ZnO was deposited on the tip-side of the cantilever. The film causes the cantilever to act as a bimorph such that by applying a voltage dependent stress, the cantilever will bend. This bending of the cantilever, through an angle of one degree, or even less, results in microns of Z positioning range. Further, implementing the Z position actuator in the cantilever increases the Z-position bandwidth of the contact mode AFM by more than an order of magnitude.

Nevertheless, such an AFM exhibits new problems with the Z positioning which were not concerns with other known AFMs. For instance, the range of the Z actuator integrated with the cantilever is less than is required for imaging many AFM samples. In addition, because the positioning sensitivity of each cantilever is different, the AFM requires recalibration whenever the probe is changed due to a worn or broken tip. Further, the sensitivity in some cases exhibits undesirable non-linearity at low frequencies. These problems can make the Z actuator integrated with the cantilever a less than optimal choice for general use as the Z actuator in commercial AFMs.

Furthermore, notwithstanding the above, in many AFM imaging applications, the use of contact mode operation is unacceptable. Friction between the tip and the sample surface can damage imaged areas as well as degrade the tip's sharpness. Therefore, for many of the applications contemplated by the present invention, the preferred mode of operation is cyclical mode, i.e., TappingMode™. However, the bandwidth limitations associated with cyclical mode detection are typically far greater than those associated with contact mode operation.

In cyclical or non-continuous contact mode operation, the AFM cantilever is caused to act as a resonant beam in steady state oscillation. When a force is applied to the cantilever, the force can be measured as a change in either the oscillation amplitude or frequency. One potential problem associated with cyclical mode operation is that the bandwidth of the response to this force is proportional to $1/Q$ (where Q is the "quality factor" of the natural resonance peak), while the force sensitivity of the measurement is proportional to the Q of the natural resonance peak. Because, in many imaging applications, the bandwidth is the primary limiting factor of scan rate, the Q is designed to be low to allow for increased imaging speeds. However, reducing the Q of the cantilever correspondingly reduces force detection sensitivity, which thereby introduces noise into the AFM image.

A further contributing factor to less than optimal scan rates in cyclical mode operation is the fact that the amplitude error signal has a maximum magnitude. Over certain topographical features, a scanning AFM tip will pass over a dropping edge. When this occurs, the oscillation amplitude of the cantilever will increase to the free-air amplitude, which is not limited by tapping on the surface. The error signal of the control loop is then the difference between the free-air amplitude and the set point amplitude. In this instance, the error signal is at a maximum and will not increase with a further increase in the distance of the tip from the sample surface. The topography map will be distorted correspondingly.

Finally, the maximum gain of the control loop in cyclical mode is limited by phase shifts, thus further limiting the loop bandwidth. In view of these drawbacks, the Z position measurement for an atomic force microscope is typically characterized as being slew rate limited by the product of the maximum error signal and the maximum gain.

As a result, AFM technology posed a challenging problem if the scan rate in cyclical mode was to be increased significantly. One general solution proposed by Mertz et al. (Mertz, Marti, and Mlynek, "Regulation of a microcantilever response by force feedback," Appl. Phys. Lett. 62 (19) at 2344–6 (1993)) (hereinafter "Mertz"), but not directed to existing cyclical mode AFMs, included a method for decreasing the effective Q of a cantilever while preserving the sensitivity of the natural resonance. In this method, a feedback loop is applied to the cantilever resonance driver such that the amplitude of the driver to the cantilever is modified based on the measured response of the cantilever. This technique serves to modify the effective Q of the resonating cantilever and will be referred to hereinafter as "active damping." Mertz accomplished active damping by thermally exciting the cantilever by first coating the cantilever with a metal layer that had different thermal expansion properties than the cantilever beam itself. Then, in response to the feedback signals, Mertz modulated a laser incident on the cantilever, so as to apply a modified driving force.

When active damping is applied to the Mertz structure, mechanical resonances other than that of the cantilever are excited, and the gain of the active damping feedback cannot be increased enough to significantly modify the effective cantilever Q. Further, the Mertz design is prohibitively inflexible for systems contemplated by the present invention due to the fact that, among other things, the modulating laser only deflects the cantilever in one direction. This introduces a frequency doubling effect that must be accounted for to process the output. Overall, the Mertz system is complex and produces marginally reliable measurements at undesirably slow speeds.

In previous embodiments of the invention, an AFM with a Z position actuator and a self-actuated Z position cantilever (both operable in cyclical mode and contact mode), was implemented with appropriately nested feedback control circuitry to achieve high-speed imaging and accurate Z position measurements. The feedback signals applied to each of the actuators are independently monitored to indicate the topography of the sample surface, depending upon the scan rate and sample topography. Further, the feedback system can modify the effective Q of a resonating cantilever without exciting mechanical resonance's other than that of the cantilever. As a result, the system can optimize the Z-position bandwidth of the cantilever response to maximize scanning/imaging speeds, yet preserve instrument sensitivity.

Notably, however, the AFM cantilever is typically a consumable part of the system. The AFM cantilever tip wears out during the course of normal usage and must be frequently replaced. Each time a new AFM cantilever is introduced to the system, the driving oscillator must be adjusted to the natural resonance of the cantilever. In the previous embodiments of the Q modifying circuit, the cantilever is driven not only by the oscillator, but also by a filtered function of its own deflection. For each new cantilever, the transfer function of the Q modifying filter must be adjusted to optimize the response of the cantilever. This adjustment can be difficult to automate and typically requires either extensive computer processing or the intervention of an expert user.

SUMMARY OF THE INVENTION

The preferred embodiment of the present invention increases the speed and ease of use of an AFM by including an amplitude detection circuit to dynamically control the cantilever drive signal in the amplitude domain. In particular, by demodulating the cantilever response before it is used to modify the drive signal to the cantilever, the need to adjust the transfer function of a Q modifying filter in the feedback path is eliminated, thus making operation more cost-effective, efficient, and allowing ready substitution of different cantilevers.

Similar to previous embodiments, the present invention preferably combines an AFM Z position actuator and a self-actuated Z position cantilever (both operable in cyclical mode and contact mode), with appropriately nested feedback control circuitry to achieve high-speed imaging and accurate Z position measurements. The feedback signals applied to each of the actuators can be independently monitored to indicate the topography of the sample surface, depending upon the scan rate and sample topography.

According to another aspect, the lower frequency topography features of a sample, including the slope of the sample surface, are followed by a standard Z actuator while the high frequency components of the surface topography are followed by the self-actuated cantilever. Preferably, two feedback loops are employed. The first feedback loop controls the self-actuated cantilever to maintain a relatively constant force between the tip of the cantilever and the sample surface. The second feedback loop controls the standard Z actuator, at a lower speed than the first feedback loop and serves either (1) to keep the self-actuated cantilever within its operating Z range or (2) to maintain the linearity of the positioning sensitivity of the cantilever when following low frequency topography. This embodiment also allows for the standard Z actuator to be exclusively used for accurate height measurements when the scan rate is sufficiently lowered, typically less than 500 µm/sec.

According to a preferred embodiment, an AFM which operates in cyclical mode (i.e., TappingMode™) combines both the AFM Z actuator and the self-actuated cantilever with appropriate feedback control in a system that oscillates the self-actuated actuator without introducing mechanical resonance's other than that of the cantilever. Most notably, in this preferred embodiment, the self-actuated cantilever is not oscillated by vibrating a piezo-crystal mechanically coupled to the cantilever, but rather is oscillated at its resonance by directly exciting the piezoelectric material disposed thereon. This eliminates mechanical resonance's in the coupling path which would otherwise be present.

As suggested above, the speed of a standard AFM in cyclical mode is generally limited by the loop bandwidth of the force detection circuitry and the Z positioning apparatus. A further limiting factor associated with standard AFMs pertains to phase shift contributions from the various components of the loop that accumulate to limit the gain of an otherwise stable operating system. Importantly, however, the self-actuated cantilever does not have significant phase shift contributions at standard operating frequencies, even though the detection bandwidth of the AFM in cyclical mode is still limited by the width of the resonance peak of the cantilever. Therefore, the self-actuated cantilever feedback loop is considerably faster than the AFM Z position actuator feedback loop, when both are limited by the same detection bandwidth. Notably, however, this embodiment also increases the speed of the AFM Z actuator feedback loop by providing a larger error signal than that which is generated by the cyclical mode amplitude deflection detector.

Next, the combination of the standard AFM Z actuator and the self-actuated cantilever allows for greater flexibility in fast scanning cyclical mode. When the Z actuator feedback loop is disabled or operating with low gain, the topography appears as the control signal to the self-actuated cantilever. This control signal preferably also serves as the error signal for the second or AFM Z actuator feedback loop. When the gain of the second feedback loop is optimized, i.e., when the Z actuator is operating as fast as possible without yielding unreliable output, the topography then appears in the control signal for the AFM Z position actuator. As a result, by incorporating the self-actuated cantilever within the control loop, the speed of obtaining highly accurate sample characteristic measurements can be increased. Also, as in previous embodiments, the standard Z actuator can be used to remove slope or non-linearities from the scan in the case in which the self-actuated cantilever follows the topography of the sample surface. Further, as an alternative to a standard Z actuator such as a piezo-stack actuator, a thermal actuator disposed on the self-actuated cantilever can be used.

Another preferred embodiment uses the integrated piezoelectric element of a self-actuated cantilever to modify the Q of the mechanical resonance of the cantilever. In operation, the cantilever resonance preferably is excited with the integrated piezoelectric element, rather than with a mechanically coupled driving piezo-crystal. The circuit which provides the cantilever drive signal modifies the Q of the lever with feedback from the detected deflection signal.

In particular, according to one preferred embodiment, the deflection signal is phase shifted, preferably by 90 degrees, and added back to the cantilever drive signal. This feedback component of the drive signal modifies the damping of the cantilever resonance (i.e., active damping) and thereby controllably decreases or enhances the Q. Alternatively, the deflection signal can be fed to a differentiator to modify the Q of the mechanical resonance of the cantilever. The differentiated signal is added back to the cantilever drive signal as a feedback signal to provide the active damping. Notably, in this alternative embodiment, the Q can be modified to provide active enhancement, for example, to increase the sensitivity of the response. When modification of the cantilever Q is combined with the structure of the previously described embodiment wherein the self-actuated cantilever is used for Z positioning in synchronicity with an AFM Z position actuator, the scan speed of the AFM in cyclical mode can be increased by an order of magnitude or more.

Moreover, in an effort to avoid the negative effects associated with positive feedback in the system (described below), a preferred embodiment of the present invention may include a bandpass filter centered around the peak of desirable operation. The filter is preferably disposed at the output of the cantilever drive circuit so as to insure that the system damps the peak, thus allowing the system to achieve damping up to a factor of, for example, a hundred, rather than a maximum factor of fifty with the above-described systems.

Further, although the system described immediately above achieves significant damping by insuring that the peak is damped, because each cantilever may have a different resonant frequency, the phase shifter included in the damping feedback circuit will have to be adjusted. It is desirable to not have to account for differences in cantilevers that will be used with the system. All filters (for example, the just-described bandpass filter) have a phase shift associated with them. Such a phase shift typically must be quantified and accounted for, and that can be accomplished in the phase shifter for a particular frequency cantilever. However, making adjustments to the phase shifter each time a cantilever is replaced is tedious and thus does not lend itself well to current high throughput demands.

As a result, in another preferred embodiment of the invention, the imaging dynamics are modified by an active drive technique to optimize the bandwidth of amplitude detection. The deflection is preferably measured by an optical detection system including a laser and a photodetector, which measures cantilever deflection by an optical beam bounce technique or another conventional technique. The detected deflection of the cantilever is subsequently demodulated to give a signal proportional to the amplitude of oscillation of the cantilever, which is used to drive the cantilever. Note that one advantage of this preferred embodiment is that the self-actuated probe is not required for the dynamic drive circuit to be effective. For example, if a piezo-crystal mechanically coupled to the cantilever is employed to drive the cantilever, any resonances introduced thereby will not affect the active damping because the active damping circuitry is operating in the amplitude domain and thus does not have to compensate for frequency effects. This is contrary to the previous active damping embodiments which operate in the frequency domain. As a result, the performance of the active damping of the AFM cantilever of the present embodiment is not considerably reduced when the cantilever is not the self-actuated type.

Continuing, as described with respect to tapping mode imaging, a desired operating amplitude of the cantilever oscillation is represented by the amplitude setpoint. The amplitude setpoint is subtracted from the demodulated amplitude signal to generate a deflection amplitude error signal. This amplitude error signal is then used to scale the drive signal to the cantilever. In particular, this embodiment typically drives the cantilever with some nominal steady state drive amplitude and adds to that drive, a dynamic drive amplitude which is proportional to the deflection amplitude error signal.

For increased speed, the drive amplitude is controlled with negative feedback from the deflection amplitude error signal. When the probe moves toward the sample surface, the response amplitude of the probe will naturally decrease, giving a negative decreasing amplitude error signal. The dynamic drive feedback will then increase the drive to the cantilever. While scanning, the probe tip may encounter an upward going step, for example. The oscillation amplitude of the cantilever will be limited by the sample surface to a lower RMS value. The Z position feedback loop responds by moving the probe away from the surface. This is the point at which more drive amplitude is required such that the cantilever tip will continue to tap on the surface. Since the RMS amplitude is reduced, the dynamic drive circuit will be supplying the cantilever with increased drive signal amplitude to meet that need.

For gentler imaging, the drive amplitude is controlled with positive feedback from the deflection amplitude error signal. When the probe moves further away from the sample surface, the response amplitude of the probe will naturally increase, giving a positive or increasing amplitude error signal. The dynamic drive feedback will increase the drive to the cantilever to maintain tapping of the tip on the surface. When the probe moves towards the sample surface, the response amplitude of the probe will be limited by the sample surface and forced to decrease, giving a negative decreasing amplitude error signal. The dynamic drive feedback will decrease the drive to the cantilever to prevent it from tapping on the surface with excess force.

The amplitude error signal is an indication of the changing position of the probe tip with respect to the sample surface. It is used by the Z position feedback loop to maintain the probe tip in close proximity to the sample surface. The speed of the Z feedback loop is increased if the amplitude error signal is utilized to determine when the cantilever will require more drive signal amplitude in order for the Z position feedback loop to respond quickly to topographic changes.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1:
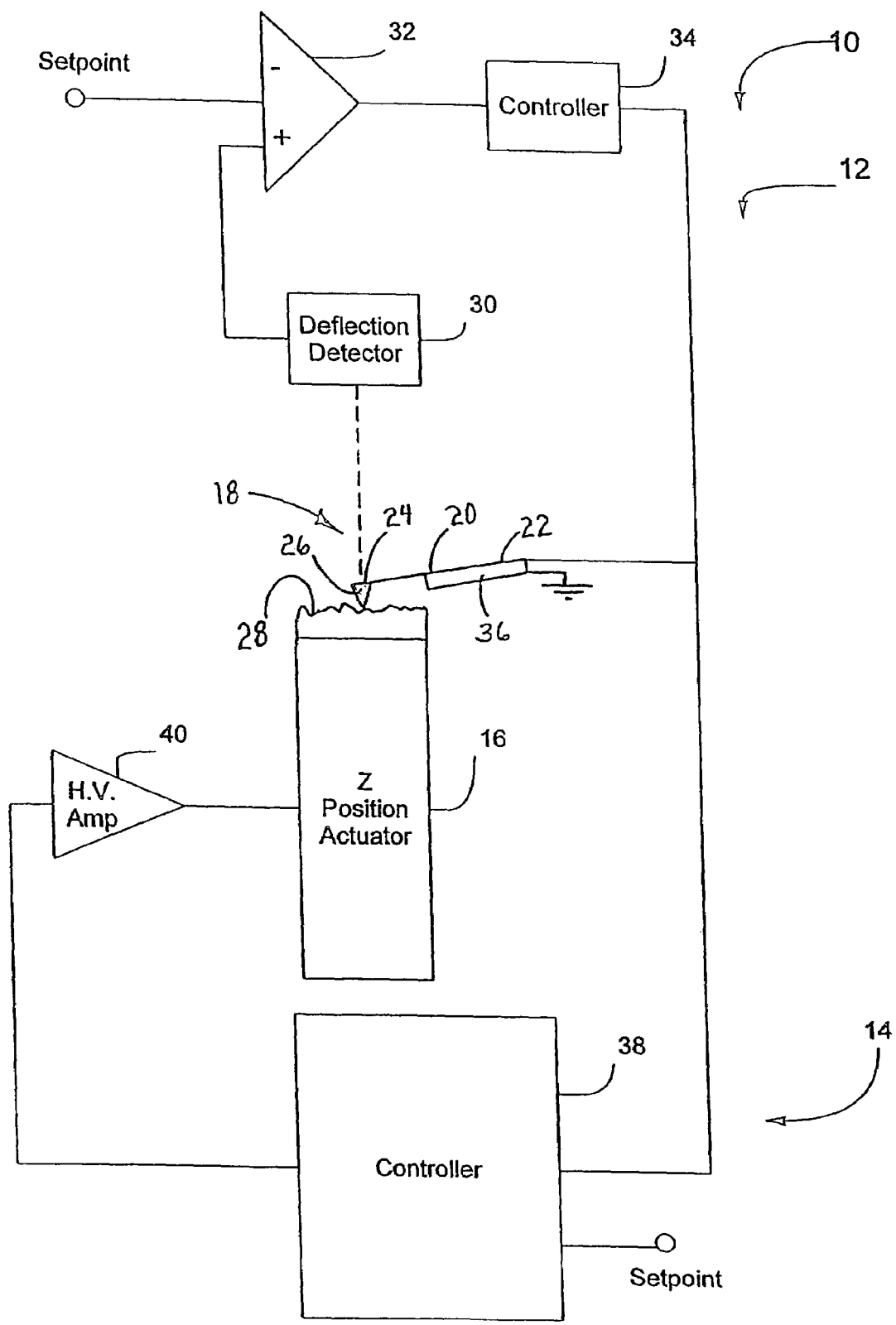
FIG. 1 is a schematic diagram illustrating an AFM according to the present invention including a self-actuated cantilever and feedback circuitry to control the cantilever in contact mode operation.

Referring to FIG. 1, an AFM 10 according to the present invention, which is configured for contact mode operation, is shown. AFM 10 includes two feedback loops 12 and 14 that control an AFM Z position actuator 16 and a probe assembly 18, respectively. Probe assembly 18 includes a self-actuated cantilever 20 having a tip 26 that interacts with a sample during scanning. When scanning in contact mode, tip 26 generally continually contacts the sample, only occasionally separating from the sample, if at all. For example, at the end of a line scan tip 26 may disengage the sample surface. While it scans the surface of the sample, cantilever 20 responds to the output of feedback loop 12 to ultimately map the topography of the surface of the sample, as described in further detail below.

Cantilever 20 includes a fixed end 22 preferably mounted to an AFM mount (not shown) and a free distal end 24, generally opposite fixed end 22, that receives tip 26. In operation, the interaction between tip 26 and sample surface 28 causes the deflection of cantilever 20. To measure this deflection, AFM 10 includes a deflection detector 30 that may preferably be an optical detection system for measuring the cantilever deflection by one of the following methods: (1) an optical beam bounce technique (see, e.g., Meyer and Amer, "Novel Optical Approach to Atomic Force Microscopy," Appl. Phys. Lett. 53, 1045 (1988); Alexander, Hellemans, Marti, Schneir, Elings, Hansma, Longmire, and Gurley, "An Atomic-Resolution Atomic-Force Microscope Implemented Using an Optical Lever," Appl. Phys. Lett. 65 164 (1989)); (2) an interdigital diffraction grating technique (Manalis, Minne, Atalar, and Quate, "Interdigital Cantilevers for Atomic Force Microscopy," Appl. Phys. Lett., 69 (25) 3944–6 (1996); Yoralioglu, Atalar, Manalis, and Quate, "Analysis and design of an interdigital cantilever as a displacement sensor," 83 (12) 7405 (June 1998)); or (3) by any other known optical detection method. These optical-based systems typically include a laser and a photodetector (neither shown) that interact according to one of the above techniques. When used in conjunction with very small microfabricated cantilevers and piezoelectric positioners as lateral and vertical scanners, AFMs of the type contemplated by the present invention can have resolution down to the molecular level, and can operate with controllable forces small enough to image biological substances.

Deflection detector 30 could also be a piezoresistor integrated into the cantilever with an associated bridge circuit for measuring the resistance of the piezoresistor (Tortonese, Barrett, and Quate, "Atomic Resolution With an Atomic Force Microscope Using Piezoresistive Detection," Appl. Phys. Lett., 62, 8, 834–6 (1993)). Alternatively, deflection detector 30 could be a circuit for measuring the impedance of the piezoelectric element of self-actuated cantilever 20, or another similarly related apparatus.

With further reference to FIG. 1, AFM 10 operates at a force determined by a combination of a first signal having a setpoint value and a cantilever detection signal generated by deflection detector 30. In particular, AFM 10 includes a difference amplifier 32 that receives and subtracts the setpoint signal from the cantilever deflection signal thereby generating an error signal. Difference amplifier 32 transmits the error signal to a controller 34, preferably a PID (proportional-integral-derivative) controller, of feedback loop 12. Controller 34 can be implemented in either analog or digital, and may apply either a linear gain or a gain characterized by a more complex computation. In particular, controller 34 can apply a gain to the error signal that is defined by one or more of a proportional, an integral or a differential gain.

Controller 34, in response to the error signal, then generates a control signal and transmits the control signal to a piezoelectric element 36 disposed on self-actuated cantilever 20. By controlling the Z or vertical position of piezoelectric element 36 of cantilever 20 with feedback control signals from controller 34, AFM 10 ideally operates to null the error signal generated by difference amplifier 32. When the error signal is nulled, the force between tip 26 and sample surface 28 is maintained at a generally constant value equal to the setpoint. Note that, optionally, a high voltage amplifier (not shown) may be employed to increase the voltage of the control signal transmitted to cantilever 20, but is not required for most applications.

The control signal applied to cantilever 20 by controller 34 of feedback circuit 12 is also input, preferably as an error signal, to a second feedback circuit 14 such that first feedback circuit 12 is nested within second feedback circuit 14. Feedback circuit 14 includes a second controller 38 which, like controller 34, can be implemented in analog or digital and may apply either a linear gain or a gain having a more complex computation. Controller 38 has a second input to which is applied a comparison signal having a second setpoint value that is equal to the Z center point of the actuator that it controls, e.g., AFM Z position actuator 16. Preferably, this setpoint is a zero coordinate value, thus making the cantilever control signal (the output of controller 34) itself the error signal. Similar to controller 34, controller 38 (also preferably a PID controller) conditions the error signal (i.e., the difference of its input signals) with a gain that is characterized by one or more of a proportional, integral or differential gain. Controller 38 generates a second feedback control signal that is ultimately applied to Z position actuator 16 to effectively null the low frequency components of the control signal generated by feedback circuit 12. A high voltage amplifier 40 may be employed to increase the voltage of the control signal output by controller 38 to Z position actuator 16 and, for most position transducers of the scale contemplated by the present invention, such an amplifier 40 is required.

To operate at maximum scanning rate, the gain of the second feedback loop 14 which controls Z position actuator 16, is reduced to zero or some small value. As a result, at a scanning rate greater than about 500 µm/sec, the topography of sample surface 28 appears as the feedback control signal applied to self-actuating cantilever 20 by first feedback loop 12. In this case, Z position actuator 16 may be controlled in a pre-programmed manner to follow the slope of sample surface 28 or to eliminate coupling due to the lateral scanning of tip 26.

Further, in this embodiment, the sensitivity of the self-actuated cantilever 20 can be calibrated with the standard Z position actuator 16. Sensitivity calibration is accomplished by moving the two actuators 16 and 36 in opposite directions to achieve a zero net movement of the tip 26 as measured by force deflection detector 30, and comparing the respective non-zero control signals required to accomplish this zero net movement.

Figure 2:
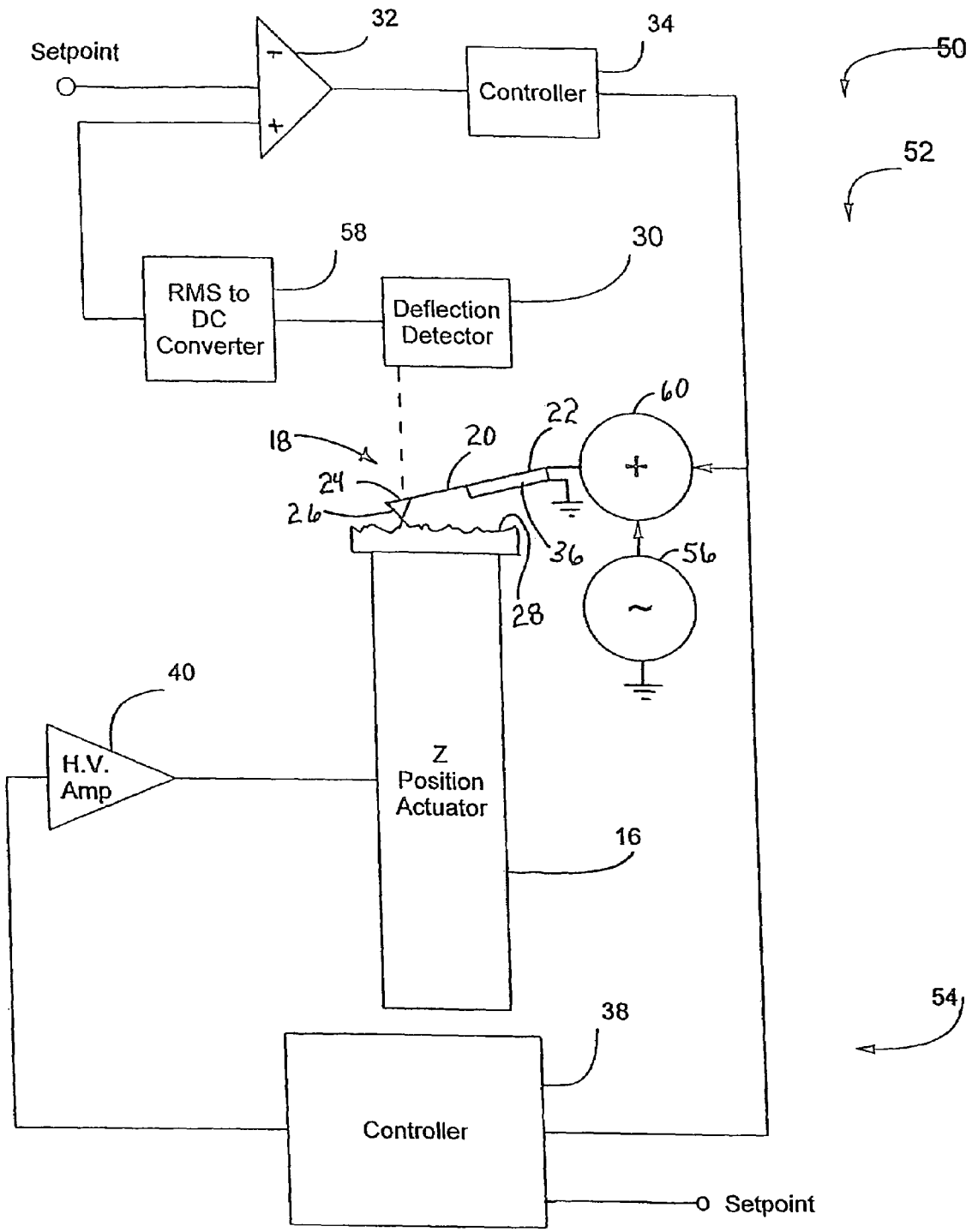
FIG. 2 is a schematic diagram illustrating an AFM according to a second embodiment of the present invention including a self-actuated cantilever and feedback circuitry to control the cantilever in cyclical mode operation.

Turning to FIG. 2, an AFM 50 according to another preferred embodiment of the invention, designed for TappingMode™ or cyclical mode operation, is shown. AFM 50, like the embodiment show in FIG. 1, includes two feedback circuits (loops) 52 and 54 that respectively control self-actuated cantilever 20 of probe assembly 18 and AFM Z position actuator 16. AFM 50 also includes an oscillator 56 that vibrates self-actuated cantilever 20 by applying an oscillating voltage directly to piezoelectric element 36 of self-actuated cantilever 20. The resulting oscillation of the cantilever 20 can be characterized by its particular amplitude, frequency and phase parameters. Note that AFM Z position actuator 16 is preferably a piezo-tube actuator, and a sample to be analyzed is disposed on the piezo-tube actuator such that movement of actuator 16 is generally normal to the scanning surface 28 of the sample.

When tip 26 is in close proximity to sample surface 28, the force interaction between tip 26 and sample surface 28 modifies the amplitude of vibration in cantilever 20. Similar to the contact mode embodiment shown in FIG. 1, deflection detector 30 measures the deflection of cantilever 20 by an optical beam bounce technique, an interdigital diffraction grating technique, or by some other optical detection method known in the art.

In operation, once detector 30 acquires data pertaining to cantilever deflection, detector 30 generates a deflection signal which is thereafter converted to an RMS amplitude signal by an RMS-to-DC converter 58 for further processing by loop 52. Note that, alternatively, lock-in detection, or some other amplitude, phase, or frequency detection technique may be used as an alternative to RMS-to-DC converter 58.

The operating RMS amplitude of the cantilever vibration is determined at least in part by the setpoint value. A difference amplifier 32 subtracts a signal corresponding to the setpoint value from the cantilever deflection signal output by converter 58. The error signal generated by difference amplifier 32 as a result of this operation is input to controller 34. Controller 34 (again, preferably a PID controller) applies one or more of proportional, integral and differential gain to the error signal and outputs a corresponding control signal. Controller 34 then applies this control signal to piezoelectric element 36 of self-actuated cantilever 20 to control the Z position of cantilever 20 as the cantilever traverses varying topography features of the sample surface. By applying the feedback control signal as described, feedback loop 52 ultimately nulls the error signal such that, for example, the oscillation amplitude of cantilever 20 is maintained at the setpoint value.

A summing amplifier 60 then sums the feedback control signal output by controller 34 with the output of driving oscillator 56 so as to apply the feedback cantilever control signal to element 36. Note that a high voltage amplifier (not shown) may be employed to increase the voltage of the summed signal output by amplifier 60 and applied to piezoelectric element 36 of cantilever 20, but is not required.

The control signal applied to summing amplifier 60 from the controller 34 is also input to controller 38 as the error signal of second feedback loop 54 such that first feedback loop 52 (similar to feedback loop 12 of the contact mode embodiment of FIG. 1) is nested within second feedback loop 54. Controller 38 has a second input that receives a comparison signal having a second setpoint value that is equal to the Z center point of the actuator that it controls, e.g., the AFM Z actuator 16. Preferably, this setpoint value is a zero coordinate value such that the cantilever control signal is itself the error signal. Controller 38 applies one or more of proportional, integral and differential gain to the error signal and outputs a corresponding control signal for controlling Z position actuator 16, and therefore the Z position of the sample. This control of the Z position of the sample operates to effectively null the low frequency components of the self-actuated cantilever control signal generated by feedback circuit 52. Note that a high voltage amplifier 40 may be employed between the output of controller 38 and the input of Z position actuator 16 to increase the voltage of the control signal applied by controller 38 to Z position actuator 16, and is required for most position transducers of the scale contemplated by the present invention.

During fast scanning operation, as in the previously described embodiment, the gain of second feedback loop 54, which controls Z position actuator 16, is preferably reduced to zero or some small value. In this cyclical mode case, Z position actuator 16 may be controlled, for example, in a pre-programmed manner, to either follow the slope of sample surface 28 or to eliminate coupling due to the lateral scanning of tip 26. To the contrary, when the gain of second feedback loop 54 is optimized, the control signal output by loop 54 is indicative of the sample topography. As a result, depending upon scanning rate, the feedback cantilever control signals output by loop 52, and corresponding to particular lateral coordinates, are indicative of the topography of sample surface 28. These signals can then be further processed to create an image of the sample surface.

The bandwidth of the amplitude detection of the cantilever in cyclical mode or in non-contact mode is limited by the frequency width of the mechanical resonance peak of the cantilever, which is defined by the 3 dB roll-off frequencies. In particular, the 3 dB roll-off is equal to f/2Q, where f is the center frequency of the resonance peak and Q is the quality factor of the cantilever resonance peak. As such, the width of the resonance peak is proportional to the quality factor Q of the resonance peak.

Figure 3:
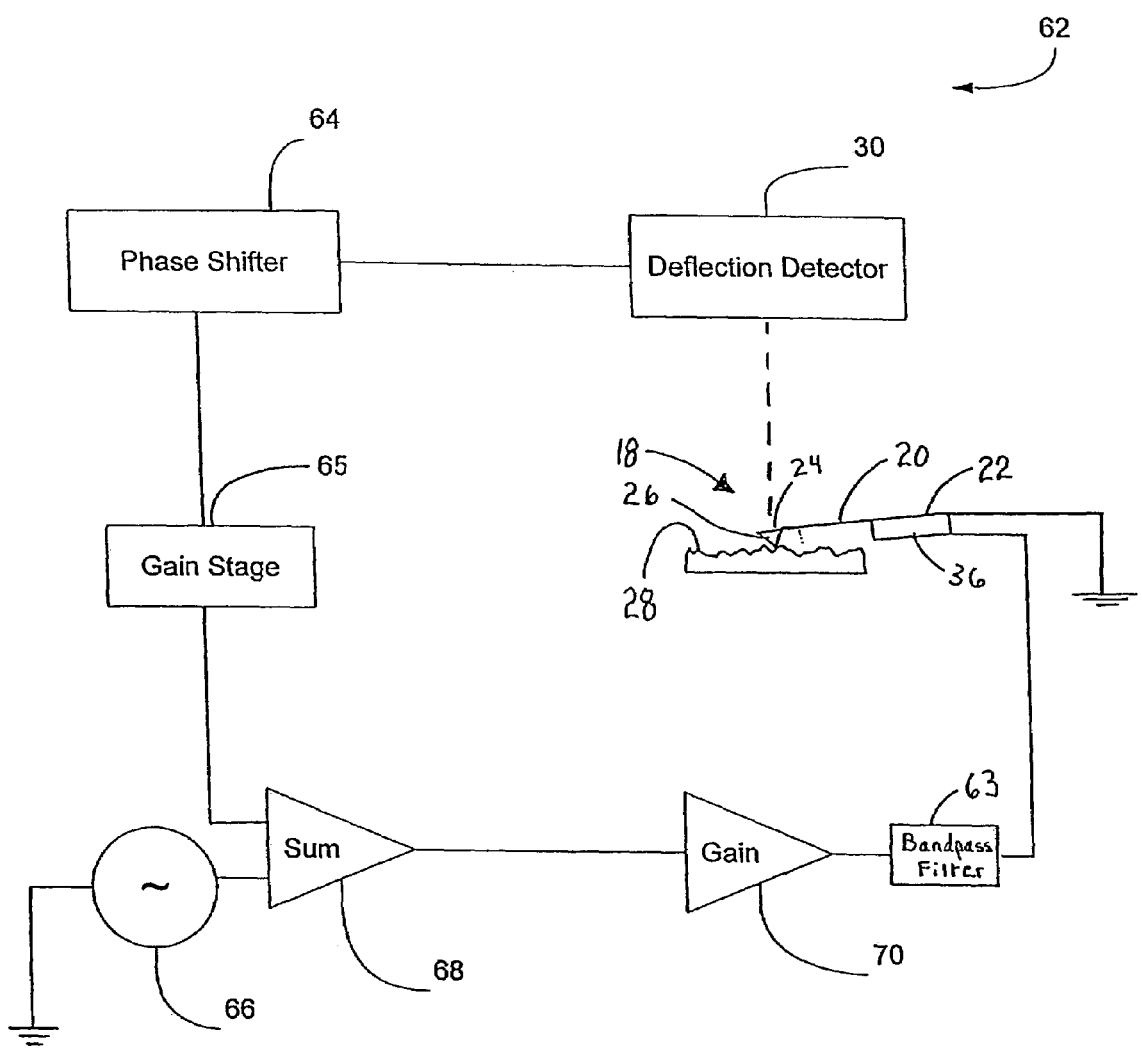
FIG. 3 is a schematic diagram illustrating a self-actuated AFM cantilever according to the present invention and a cantilever drive circuit which modifies the quality factor ("Q") of the cantilever.

FIG. 3 shows schematically how the Q (quality factor of the cantilever resonance peak) of self-actuated cantilever 20 can be modified using a deflection feedback technique. Generally, an active damping feedback or cantilever drive circuit 62 modifies the oscillating voltage output by a driving oscillator 66 (and applied directly to piezoelectric element 36 of cantilever 20) to optimize the bandwidth of amplitude detection. Active damping circuit 62 utilizes a deflection detector 30 that, as described with respect to FIGS. 1 and 2, is preferably an optical detection system including a laser and a photodetector, and which measures cantilever deflection by an optical beam bounce technique or another conventional technique. Alternatively, as in the previously described embodiments, deflection detector 30 could be (1) a piezoresistor integrated into cantilever 20 with an associated bridge circuit for measuring the resistance of the piezoresistor, or (2) a circuit for measuring the impedance of the piezoelectric element 36 of self-actuated cantilever 20.

As it senses a deflection of cantilever 18, deflection detector 30 transmits a corresponding deflection signal to a damping element of active damping circuit 62. In one preferred embodiment, the damping element is a phase shifter 64 that advances or retards the phase of the sensed deflection signal by 90 degrees. This phase shift acts as a damping component of the oscillatory motion of cantilever 20 to modify the Q of the mechanical resonance of the cantilever. The phase-shifted deflection signal is then summed with the output of a driving oscillator 66 by a summing amplifier 68.

The relative gain of the oscillator signal amplitude to the phase shifted deflection signal determines the degree to which the Q of the cantilever resonance is modified, and therefore is indicative of the available bandwidth. Note that the ratio of the two summed signals can be scaled at summing amplifier 68 to determine the extent to which the cantilever resonance is modified. Alternatively, a gain stage 65 could be inserted between phase shifter 64 and summing amplifier 68 to scale the phase-shifted signal and obtain the resonance modifying data.

Notably, as the operator turns the gain up to achieve optimum operation, the cantilever may be driven to undesirably operate at one of its harmonics. As a result, due to this change or due to the actuator of the self-actuating probe being imperfect (e.g., the probe may have a resonance at about 50 kHz), the actuator may feed back positively and drive the cantilever so the cantilever ends up oscillating at a frequency other than at the desired operating frequency. This acts as a limit to how much damping can be realized. In an effort to avoid generating this positive feedback, a bandpass filter 63 centered around the peak of desirable operation, and preferably disposed at the output of the cantilever drive circuit 62 (see FIGS. 3–6) can be included so as to insure that the system damps the peak, thus allowing the system to achieve damping up to a factor of, for example, a hundred, rather than a maximum factor of fifty with the above-described system 80.

In sum, by actively damping the oscillation voltage to modify the Q as described above, damping circuit 62 ideally optimizes the bandwidth of the response of the cantilever 20. As a result, the AFM can maximize scan rate, yet still maintain an acceptable degree of force detection sensitivity.

Figure 4:
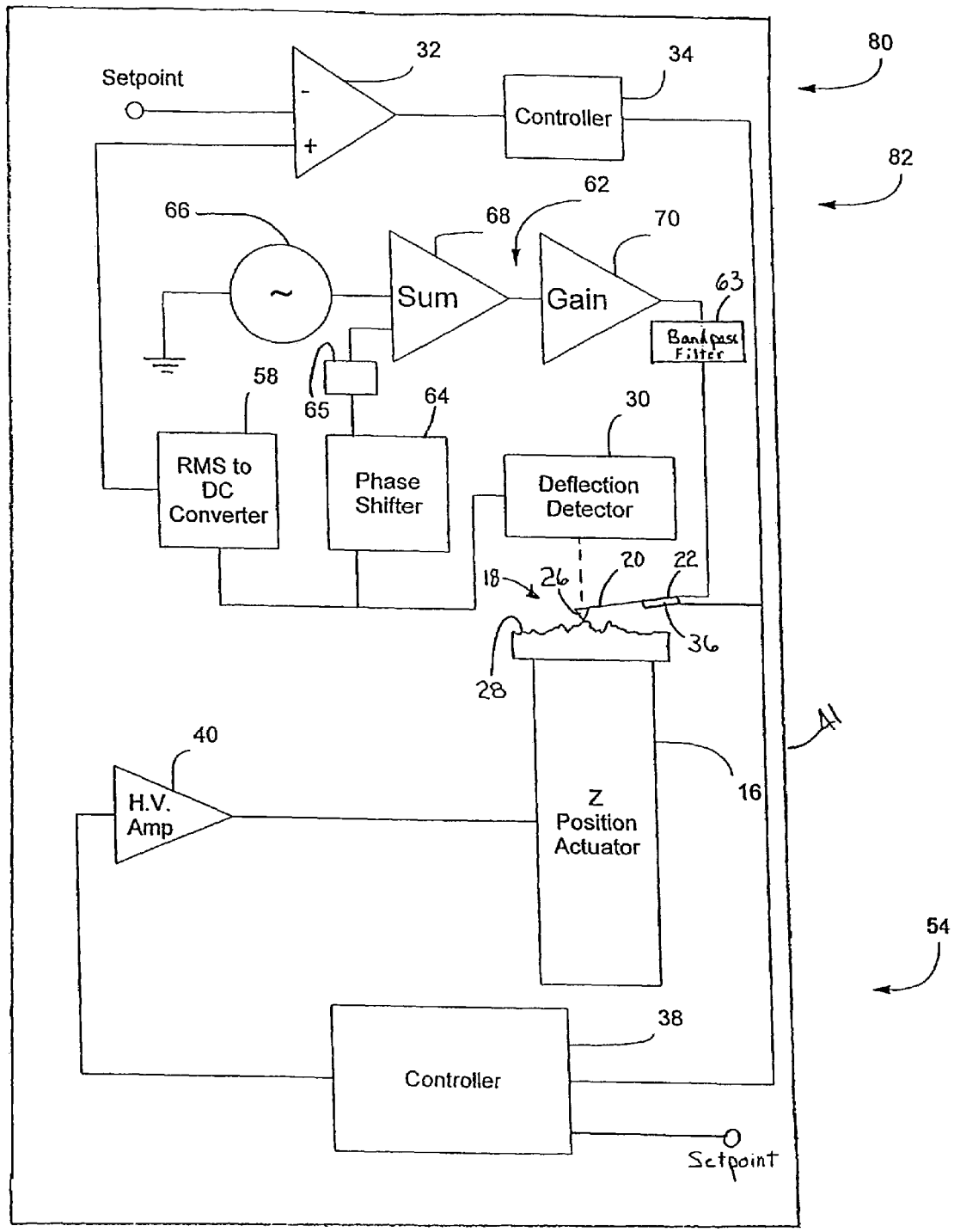
FIG. 4 is a schematic diagram illustrating an AFM according to the present invention including a self actuated cantilever and feedback circuitry to control the cantilever in cyclical mode, and a cantilever drive circuit for modifying the quality factor ("Q") of the cantilever.

FIG. 4 shows an AFM 80 according to an alternate embodiment of the present invention incorporating the features of AFM 50 (cyclical mode configuration—FIG. 2), including two nested feedback loops 82 and 54, with the features of active damping circuit 62 (FIG. 3) to modify the Q of cantilever 20 in fast scanning cyclical mode operation. By actively damping the resonance of cantilever 20 with feedback signals output by circuit 62, the force detection bandwidth rises proportionally with a corresponding decrease in the Q. By combining a decrease in Q with the control features of AFM 50 (FIG. 2), AFM 80 realizes much greater loop bandwidth in cyclical mode, thus achieving much greater (and much more commercially viable) throughput per machine.

With further reference to FIG. 4, AFM 80 operates as follows. Initially, the deflection signal obtained by deflection detector 30 during a scanning operation is phase shifted by phase shifter 64 of active damping circuit 62. As noted above, the phase of the deflection signal is advanced or retarded by 90 degrees such that it acts as a damping component of the oscillatory motion of cantilever 20, thus modifying the cantilever Q. The phase-shifted deflection signal is then summed with the output of oscillator 66 by summing amplifier 68.

The ratio of the two summed signals can be scaled at summing amplifier 68 to determine the extent to which the cantilever resonance is modified. Alternatively, as described in connection with FIG. 3, a gain stage 65 can be inserted between the phase shifter and the summing amplifier to scale the phase-shifted signal. The output of summing amplifier 68 is then further amplified (with amplifier 70) to a suitable voltage for driving piezoelectric element 36 of self-actuated cantilever 20.

With continued reference to FIG. 4 and the more specific operation of AFM 80, the output of amplifier 70 drives self-actuated cantilever 20 at a frequency equal to that of the natural resonance of cantilever 20, wherein the Q of the driving frequency is modified by active damping circuit 62 to increase overall loop bandwidth. This change in Q increases the speed of data collection, for example, via scanning/imaging. Moreover, in an effort to avoid generating undesirable positive feedback, a bandpass filter 63 centered around the peak of desirable operation, and preferably disposed at the output of the cantilever drive circuit 62 (see FIGS. 3–6) can be included so as to insure that the system damps the peak. Notably, because the piezoelectric element 36 disposed on cantilever 20 is used to drive cantilever 20 at its resonant frequency, the oscillating voltage in this embodiment can be applied directly to cantilever 20 without introducing extraneous mechanical resonance's into the system.

When the tip 26 is in close proximity to sample surface 28, the force interaction between tip 26 and sample surface 28 modifies the amplitude of vibration in cantilever 20. The deflection signal generated by the deflection detector 30 in response to a detected change in the amplitude of vibration is then converted to an RMS amplitude signal by RMS to DC converter 58 to facilitate further processing. Notably, lock-in detection or some other amplitude, phase, or frequency detection technique may be used in place of RMS to DC converter 58.

Similar to AFM 50, the operating RMS amplitude of the cantilever vibration is determined (at least in part) by the setpoint value, which is subtracted from the cantilever deflection signal by difference amplifier 32. The error signal generated by difference amplifier 32 is input to controller 34. Controller 34 applies one or more of proportional, integral and differential gain to the error signal and controls piezoelectric element 36 of self-actuated cantilever 20 to null the error signal, thus ensuring that the amplitude of cantilever oscillation is kept generally constant at a value equal to the setpoint. A high voltage amplifier (not shown) may be employed to increase the voltage of the signal to cantilever 20, but is not required.

The control signal transmitted by controller 34 to cantilever 20 is also input to controller 38 of second feedback loop 54 such that first feedback loop 82 is nested within second feedback loop 54. Preferably, the second setpoint input to controller 38 is a zero value associated with AFM actuator 16, in which case the cantilever control signal is itself the error signal conditioned by controller 38. Again, PID controller 38 applies one or more of proportional, integral and differential gain to the error signal for ultimately controlling Z position actuator 16 to null the low frequency components of the control signal applied to the self-actuated cantilever, when scanning at an optimum rate. Further, as highlighted above, a high voltage amplifier 40 may be employed to increase the voltage of the control signal applied to Z position actuator 16, and is required for most position transducers of the scale contemplated by the present invention.

In sum, AFM 80 combines an AFM Z actuator 16 with a self-actuated cantilever 20 in a manner that allows both high speed imaging and accurate Z position measurement by decreasing the effective Q of cantilever 20 with damping circuit 62. Damping circuit 62 actively modifies the oscillating voltage signal output by oscillator 66, while preserving the sensitivity of the natural resonance, to insure that the bandwidth of the cantilever response is optimized. Further, depending upon the particular sample topography and the scan rate, the topography can be mapped by monitoring one of the feedback control signals independent of the other.

Figure 5:
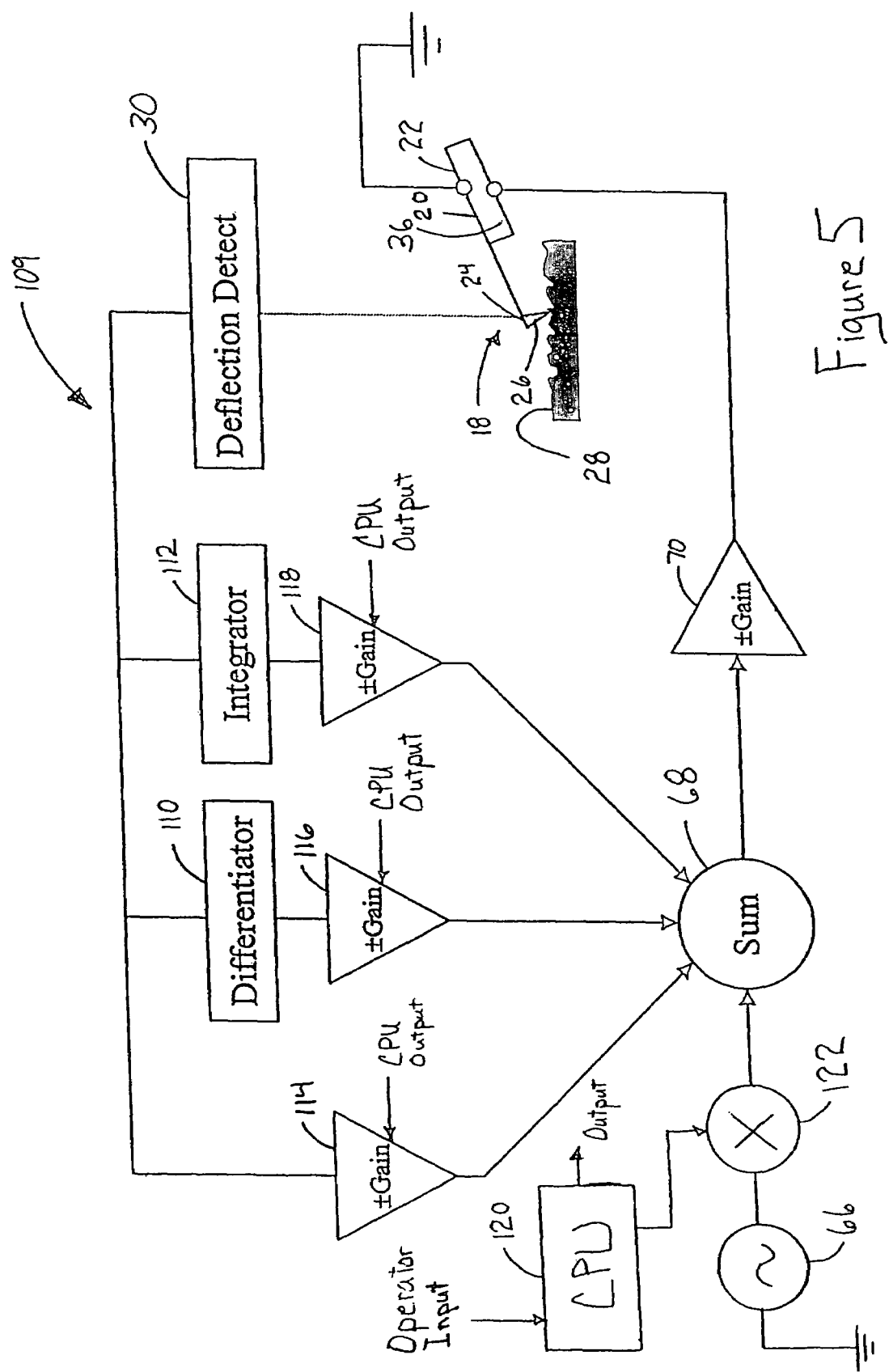
FIG. 5 is a schematic diagram illustrating a self-actuated AFM cantilever according to the present invention and an alternate embodiment of the cantilever drive circuit which modifies the quality factor ("Q") of the cantilever.

In an alternative embodiment to the deflection feedback circuitry shown in FIG. 3, a cantilever drive circuit 109 includes a damping element that comprises a differentiator 110, as shown in FIG. 5. Differentiator 110, in conjunction with an adjustable gain stage 116, provides a signal that is a very close approximation to the damping component of the cantilever oscillation so as to change the system Q. More particularly, differentiator 110 differentiates the deflection signal sensed by deflection detector 30 during operation. The differentiated signal is then applied to the gain stage 116. The gain applied by gain stage 116 is adjusted to selectively modify the Q of the cantilever so as to realize a desired Q, $Q_{new}$.

Next, the differentiated deflection signal is applied to summing amplifier 68 and summed with the output of driving oscillator 66 to provide the modified oscillating voltage, similar to active damping circuit 62 described previously. Prior to applying the modified oscillating voltage to cantilever 20, an amplifier 70 amplifies the output of summing amplifier 68 to a suitable voltage for driving piezoelectric element 36 of self-actuated cantilever 20. During operation, the output of amplifier 70 drives self-actuated cantilever 20 at the mechanical resonance of cantilever 18. In addition, although differentiator 110 can be implemented digitally, preferably it is an analog differentiation circuit.

Notably, differentiator 110 (with appropriate gain provided by gain stage 114) can be used not only for active damping, but for active enhancement (i.e., to increase the Q) as well. For example, when operating in fluid, the viscous forces present in the system can significantly damp the system response. Therefore, to counter the damping effects of these forces, differential gain can be used to increase the Q. Although such operation can decrease operation speed, the sensitivity of the response is enhanced, thus facilitating reliable data collection. Moreover Q enhancement allows the AFM to output a larger data signal that is easier to process. Among other applications, active enhancement is particularly useful when imaging soft samples in air because the increased force sensitivity allows greater control of the drive voltage (e.g., greater control over the tip-sample interaction), thus minimizing the chance of damaging the sample.

Cantilever drive circuit 109 includes two additional branches, one including an integrator 112 having an output coupled to a corresponding amplifier 118 to provide integral gain, while the other comprises an amplifier 114 that provides proportional gain. Integrator 112 and the associated amplifier 118 process the cantilever deflection signal so as to tune the feedback response in conventional fashion. The proportional gain provided by amplifier 114, on the other hand, can be used to actively modify the response of the cantilever. In particular, amplifier 114 applies proportional gain, preferably to change the resonant frequency of the cantilever, which, as discussed previously, is the preferred frequency of operation. Cantilever drive circuit 109 will employ proportional gain if, for example, the system experiences significant noise at the operational resonant frequency. Such noise can significantly compromise data collection and imaging capabilities such that, by shifting the resonant frequency with proportional gain, cantilever drive circuit 109 permits the AFM to operate at a frequency where noise is not a significant limitation.

Amplifiers 114, 116 and 118 are preferably independently adjustable with positive and negative polarities. Amplifiers 114, 116, 118 are controlled either manually, typically as the user observes the AFM output, or automatically via, for example, a central processing unit 120 or microprocessor, which computes the proper gain in response to the desired Q, preferably input by the operator. CPU 120 can use an algorithm embedded in memory to intelligently apply differential, proportional and integral gain in response to analyzing the deflection signal, thus optimizing AFM operation in terms of speed and data collection quality, as described previously.

To determine the proper amount of gain to be applied for a desired response, the AFM is modeled. According to the preferred embodiment, the feedback system shown in FIG. 5 can be characterized by the following equation, $$\frac{V_o}{V(\omega)} = \frac{\gamma k \eta \chi(\omega)}{1 - \gamma k \eta \chi(\omega) G(\omega)} \quad \text{Eqn. 1}$$

wherein $\chi(\omega)$ is the cantilever response, $\gamma k$ is the response of the piezoelectric element, (zinc oxide for example), $\eta$ is the response of the deflection detector 30 (e.g., a photodiode sensor) and $G(\omega)$ is the gain to be applied. The response of the piezoelectric element ($\gamma k$) and the response of the photodiode ($\eta$) are predetermined according to the type of cantilever used and therefore define constants in Equation 1.

The cantilever can be modeled as a basic second-order system having a frequency-based response characterized by the following equation, $$\chi(\omega) = \frac{\omega_o^2/k}{\omega_o^2 - \omega^2 + \frac{i\omega\omega_o}{Q}} \qquad \text{Eqn. 2}$$

wherein $\omega_o$ is the resonant frequency of the cantilever, $\omega$ is the operational frequency of the system, k is the spring constant, and Q is the native Q of the system (a quantity that is measured during operation). Therefore, the system response becomes, $$\frac{V_o}{V(\omega)} = \frac{\gamma\eta\omega_o^2}{(\omega_o^2 - \omega^2) + \frac{i\omega\omega_o}{Q} - \gamma\eta\omega_o^2 G(\omega)} \qquad \text{Eqn. 3}$$

where $G(\omega)$ can be any physically realizable function, real or imaginary, so as to provide proportional, differential, integral, $\omega^2$, etc. gain.

More particularly, the expression $i\omega\omega_o/Q$ is the term representative of differentiator 110 and, therefore, is the term that is manipulated to modify cantilever damping. To modify cantilever damping, i.e., to modify the Q of the cantilever, the gain is set according to the following equation, $$G(\omega) = i\frac{\omega}{\omega_o}\frac{1}{\gamma\eta}\left(\frac{1}{Q} - \frac{1}{Q_{new}}\right) \qquad \text{Eqn. 4}$$

where, again, Q is the native Q, and $Q_{new}$ is the desired Q for optimum operation.

When substituting the gain (Eqn. 4) into the system response as defined by Eqn. 3, the response remains the same except that the native Q is replaced by the desired Q, $Q_{new}$. In particular, the system response becomes, $$\frac{V_o}{V(\omega)} = \frac{\gamma\eta\omega_o^2}{(\omega_o^2 - \omega^2) + \frac{i\omega\omega_o}{Q_{new}}} \qquad \text{Eqn. 5}$$

As an example, in computing the gain as defined in Eqn. 4, we can assume that the phase is 90° and that $\omega$ equals $\omega_o$ (which is preferably the case where the AFM is operated at the resonant frequency of the cantilever). As a result, the gain becomes, $$\text{Abs}(G) = \frac{1}{\gamma\eta Q} - \frac{1}{\gamma\eta} \cdot \frac{1}{Q_{new}} \qquad \text{Eqn. 6}$$

For a Q=300 Å/V, $\gamma$=200 Å/V and $\eta$=0.33 mV/Å, the gain is equal to 0.05–14.9/$Q_{new}$. $Q_{new}$ can be input manually by the user, or it can be intelligently selected according to an algorithm embedded in CPU 120.

For example, an algorithm for selecting a Q using computer 120 takes into consideration the spatial frequency of the sample topography, the scan size, and the scan rate which are input by the operator. The product of the scan size and the scan rate is the tip velocity. In one preferred embodiment, the algorithm is an open loop algorithm that makes an assumption about the sample topography and then scales the desired Q, $Q_{new}$, for the selected tip velocity. Notably, because any AFM image is ultimately a convolution of the sample topography and the probe tip, a limit to the spatial frequency of the topography is considered to be the geometry of the probe tip. Alternatively, a closed loop algorithm includes a subroutine of a gain setting algorithm for the Z feedback loop. One such known algorithm selects the optimum integral and proportional gain of the Z feedback loop by maximizing the autocorrelation function of the trace and retrace scan lines. Preferably, once this routine is executed, a damping subroutine uses the feedback loop error signal (RMS-setpoint) to determine if enough gain is being used (i.e., the routine determines whether the error signal is below a predetermined threshold). To achieve more gain, the Q is decreased, and then the gain setting routine is reinitiated. If the Q reaches a predetermined minimum value, then the gain setting routine operates to reduce the scan rate for optimum operation.

In general, computer 120 outputs a control signal that is communicated to one of the gain stages 114, 116, 118 for applying the appropriate gain to optimize AFM operation. To modify the Q of the cantilever, the response of both the piezoelectric element 20 and the deflection detector 30 are set according to the type of cantilever used. Based on the desired Q (i.e., $Q_{new}$), computer 120 generates a control signal and transmits the control signal to, for example, gain stage 114 so as to cause gain stage 114 to apply the appropriate gain to the detected deflection signal to increase AFM operating speed, thus reducing $Q_{new}$ and increasing the damping or drag. Alternatively, gain can be computed so as to enhance the Q and therefore decreasing the damping. In this alternative, the AFM is slowed correspondingly; however, the signal-to-noise ratio, as well as the force sensitivity, increases, thus providing advantages in terms of increased control over tip-sample interaction and operational convenience.

Overall, Q modification using phase shifting (FIGS. 3 and 4) is similar to using differential gain (FIGS. 5 and 6) to modify the Q. However, phase shifting behaves like differential gain only in a narrow bandwidth when the phase shifter is adjusted correctly (i.e., 90°). When the phase shifter is out of adjustment, phase shifting behaves like a linear combination of differential and proportional gains, thus shifting the resonant frequency as well as modifying the quality factor, Q of the cantilever. Because AFM cantilevers typically have some variation in their natural resonant frequencies, the phase shifter 64 (FIGS. 3 & 4) must be adjusted whenever the cantilever is changed, which can be quite often. With separate differential and proportional gain, cantilever drive circuit 109 modifies the damping and the resonant frequency independently without significant sensitivity to different natural resonant frequencies of different cantilevers.

Figure 6:
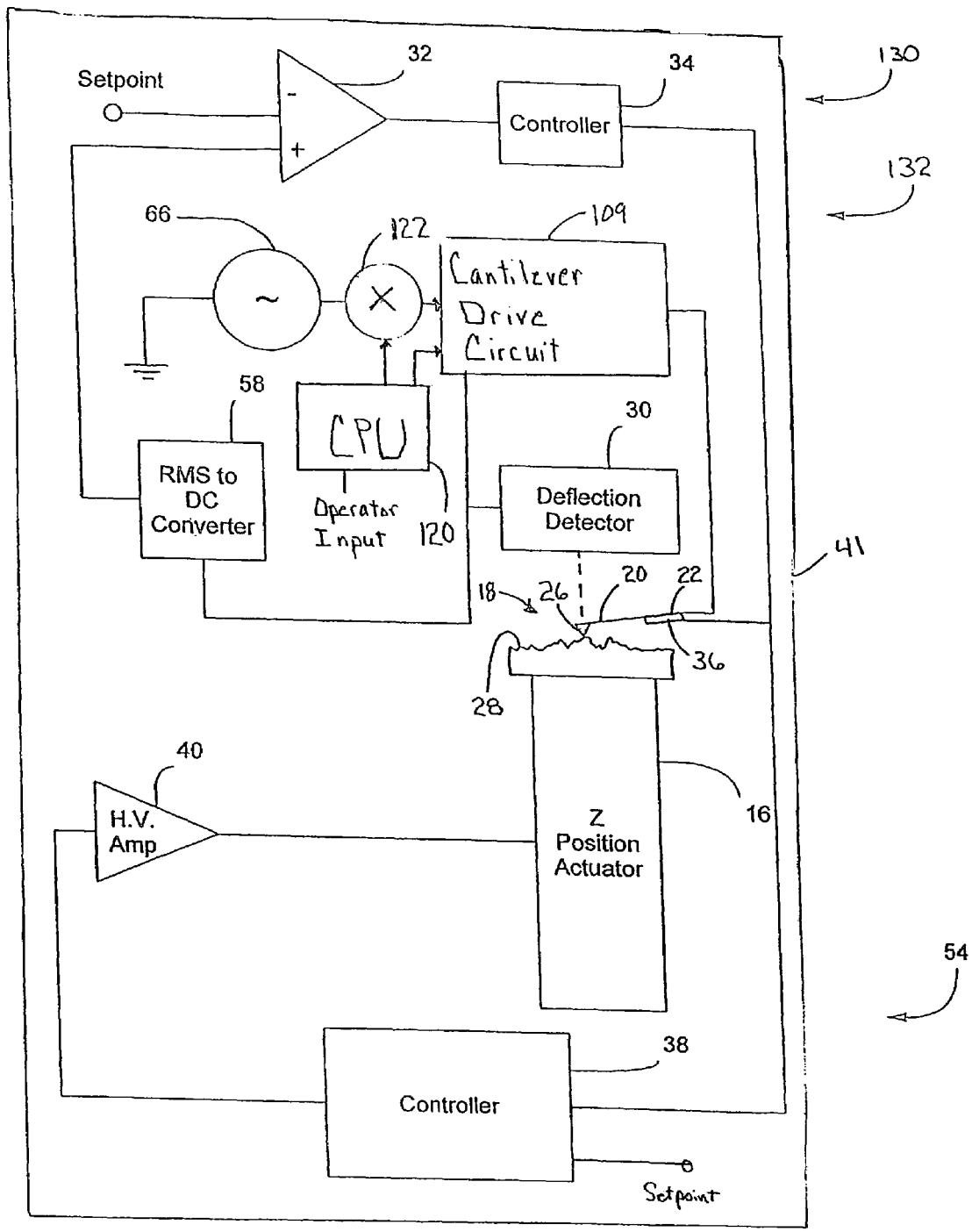
FIG. 6 is a schematic diagram illustrating an AFM according to the present invention including a self actuated cantilever and feedback circuitry to control the cantilever in cyclical mode, and an alternate embodiment of the cantilever drive circuit for modifying the quality factor ("Q") of the cantilever.

Similar to FIG. 4, FIG. 6 shows an AFM 130 according to an alternate embodiment of the present invention incorporating the features of AFM 50 (cyclical mode configuration—FIG. 2), including two nested feedback loops 132 and 54. AFM 130 also includes the features of cantilever drive circuit 109 (FIG. 6) to modify the Q of cantilever 20 in fast scanning cyclical mode operation. Alternatively, by combining the control features of AFM 50 (FIG. 2) with active enhancement provided by cantilever drive circuit 109, AFM 130 can, for example, increase the force sensitivity to facilitate imaging soft samples even though throughput may decrease. As described previously in conjunction with FIG. 5, enhancing the Q is particularly useful when operating in fluid, e.g., when imaging biological samples, because the viscous environment can have a detrimental damping effect on the Q. Overall, AFM 130 is preferably operated as fast as possible without significantly compromising force sensitivity.

Referring specifically to FIG. 6, AFM 130 is similar to AFM 80 except that cantilever drive circuit 109 is substituted for damping circuit 62. As a result, AFM 130 has the same capabilities of AFM 80. However, in addition, AFM 130 provides proportional and integral gain, as well as active Q enhancement which is implemented with applied differential gain, as described above in conjunction with FIG. 5.

When changing the Q of the cantilever, the resonant or peak amplitude of cantilever response also changes. Generally, the ratio between the amplitude and the Q will remain constant such that if you decrease the Q by a factor of two, the amplitude will correspondingly decrease by a factor of two. Notably, it is often times desired to hold the amplitude constant while changing the cantilever Q to avoid having to constantly re-scale the drive to either observe the change in Q, or use the actively modified response. Re-scaling the drive can be time consuming and often times is difficult. However, implementing a system that holds peak amplitude constant while changing the Q is not intuitive. This is due to the fact that, unlike the relationship between the amplitude and the Q, the amount one needs to increase the cantilever drive signal does not scale directly with the change in Q.

More particularly, turning again to FIG. 5, cantilever drive circuit 109 can be used in conjunction with computer 120 to compute the appropriate scale factor for the drive when changing the Q. As discussed previously with respect to Eqn. 1, each cantilever has a gain associated with the device itself (piezoelectric ($\eta$) and mechanical ($\gamma k$)), and with the sensor system. Again, Eqn. 1 represents the relationship between the desired Q, $Q_{new}$, and the associated necessary gain, G, required to achieve the $Q_{new}$. Because the AFM is preferably operated at resonance, we can assume the drive frequency is approximately equal to the resonant frequency such that the relationship defined in Eqn. 5 becomes, $$V_o = \gamma \eta Q_{new} V(\omega) \qquad \text{Eqn. 7}$$

and the gain defined in Eqn. 4 becomes, $$G(\omega) = \frac{1}{\gamma \eta} \left( \frac{1}{Q} - \frac{1}{Q_{new}} \right) \qquad \text{Eqn. 8}$$

The next step in determining the appropriate drive scale factor is to solve for $Q_{new}$ in Eqn. 8 which becomes, $$Q_{new} = \frac{Q}{(1 - \gamma \eta Q G)} \qquad \text{Eqn. 9}$$

When substituting the quantity shown in Eqn. 9 into Eqn. 7, the system response becomes, $$V_o = \frac{\gamma \eta Q}{(1 - \gamma \eta Q G)} \circ V(\omega) = \beta(G) \circ V(\omega) \qquad \text{Eqn. 10}$$

As a result, when varying the gain to alter the Q, if it is desired that $V_o$ be held constant, the appropriate amount to scale the drive, $V(\omega)$, is by $1/(\beta(G))$ or by, $$\text{Drive scale factor} = \left( \frac{1 - \gamma \eta Q G}{\gamma \eta Q} \right) = \frac{1}{(\gamma \eta Q)} - G \qquad \text{Eqn. 11}$$

Notably, $\gamma \eta Q$ is $V_{rms}/V_{drive}$, i.e., the system response $V_{drive}/V_{out}$, and is independent of other circuitry, including the active control circuitry of the present invention. In addition, G is nominally positive, such that for damping, the gain is negative. This calculation can be implemented with analog electronics, a DSP, a microprocessor or, as shown in FIG. 5, a CPU 120. In this latter case, an output of computer 120 transmits a drive scale signal indicative of the drive scale factor and applies the drive scale signal to a multiplier 122. Multiplier 122 multiplies the drive scale factor by the output of oscillator 66 so as to scale the output.

It should be highlighted that the above equations including the drive scale factor depicted in Eqn. 11, do not need to be followed. A brute force approach could be followed in which the peak amplitude is found and scaled. Performing a frequency sweep and analyzing the results can also produce these results, even though the preferred embodiment is described above. A practical "brute force" method for maintaining amplitude while changing the Q would be to first measure the RMS amplitude of the cantilever oscillation for a given drive amplitude. Thereafter, the operator can iteratively increase the damping gain, and then the drive amplitude, to arrive at the same RMS amplitude as the previously measured value. These steps are then repeated until a target drive amplitude is reached. In this case, the target is the desired change in Q×A (i.e., $\Delta Q$ times the original drive amplitude).

Notably, although the embodiments shown in FIGS. 3–6 are described in conjunction with cyclical mode operation, cantilever drive circuits 62 (FIG. 3) and 109 (FIG. 5) can be used in any mode (e.g., contact) to modify damping, alter the resonance, etc.

Figure 7:
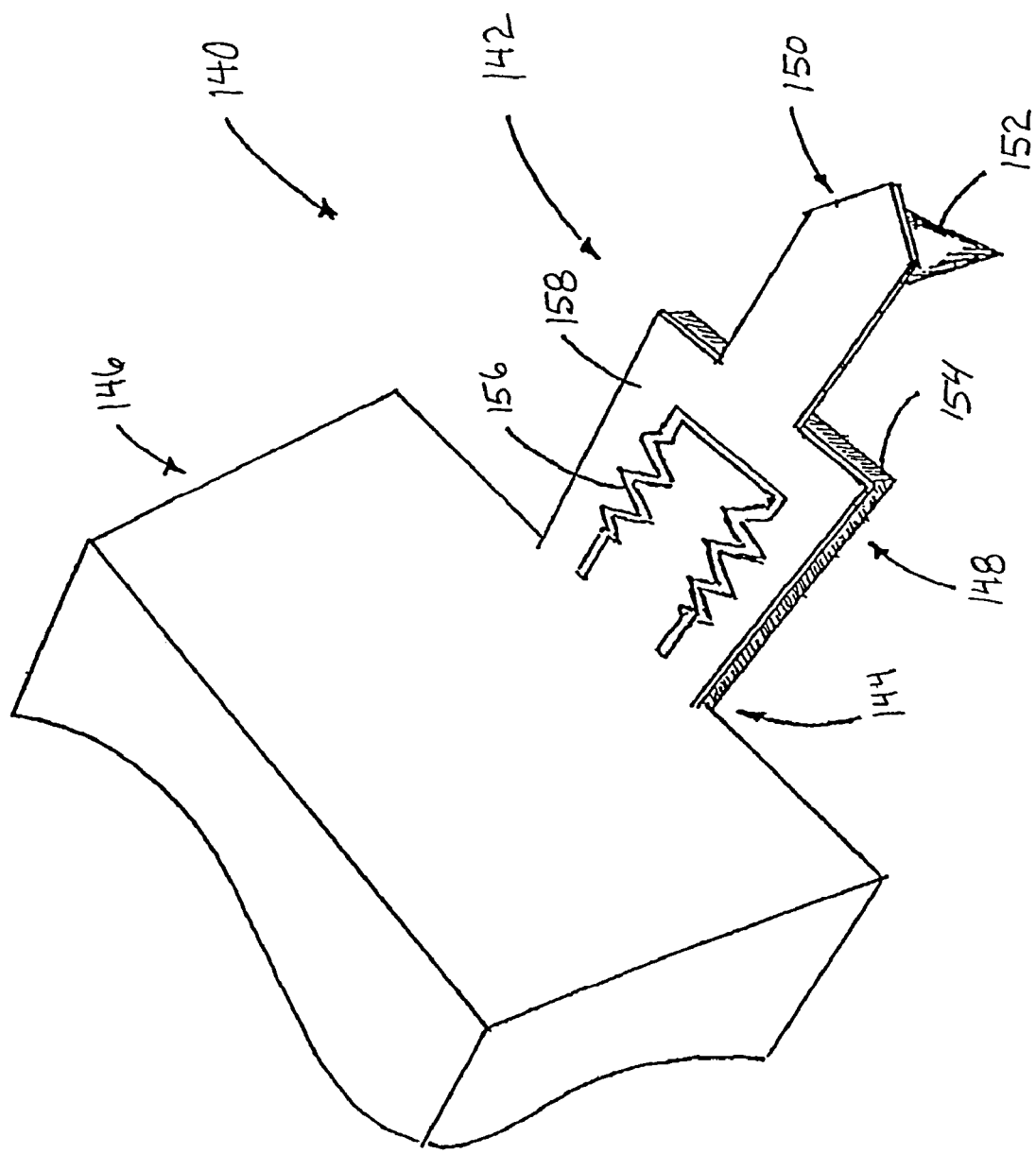
FIG. 7 is a perspective view of a probe assembly including a self-actuated cantilever having a thermal actuator integrated therewith.

Turning to FIG. 7, an alternate embodiment of the present invention includes one in which the standard AFM Z position actuator 16 (e.g., a piezo-tube actuator) of the previous embodiments is replaced with a thermally responsive actuator integrated with the self-actuated cantilever. More particularly, the alternate embodiment includes a probe assembly 140 including a self-actuated cantilever 142 having 1) a first end 144 attached to an AFM substrate 146, 2) an elongated portion 148, and 3) a second, distal end 150 that includes a tip 152 for scanning the surface 28 (see, e.g., FIG. 4) of a sample. Self-actuated cantilever 142 also includes a Z-positioning element 154 disposed thereon.

This embodiment of the invention operates on the principal of dissimilar expansion coefficients between cantilever 142. For instance, the cantilever 142 may be formed from a silicon material, and the Z-positioning element 154 may be formed from zinc oxide. In the preferred embodiment of the invention, a thermal actuator, e.g., a resistive heater 156, is integrated with the cantilever by using, e.g., a doping process.

In operation, by heating the thermal actuator (i.e., the resistive heater 156), self-actuated cantilever 142 acts as a bimorph. Specifically, the different coefficients of thermal expansion of silicon cantilever 142 and zinc oxide Z-positioning element 154 cause cantilever 142 to act as a bimorph when heated. The effect of this response is most prominent at region 158 of cantilever 142. Notably, similar to the Z position actuator 16 (piezo-tube Z actuator) of the previous embodiments, probe assembly 140 (and particularly the thermal actuator) can provide highly accurate imaging at relatively low scanning rates. When operating at slower imaging rates (e.g., less than 500 µm/sec), the zinc oxide element 154 is used as a reference for the thermal actuator, the thermal actuator being controlled by the feedback signal from, e.g., control loop 54 (FIG. 4). Further, the piezoelectric effect of zinc oxide Z positioning element 154 provides fast actuation of the cantilever for faster imaging rates.

Overall, by substituting the thermal actuator for the standard AFM piezo-tube Z actuator, the vertical range of operation of the self-actuated cantilever is increased, thus providing an effective alternative for imaging samples that have a topography that demands a higher range of vertical operation. Hence, while the actuator of the self-actuated cantilever of the previously-described embodiments preferably can cause movement of the cantilever over a range approximately equal to 2–5 µm in the Z direction and a standard piezo tube actuator operates over typically a 5–10 µm range, the thermal actuator shown in FIG. 7 can cause cantilever movement over a range approximately equal to 20–100 µm. Note that, although this alternative embodiment is described as preferably utilizing zinc oxide as the piezoelectric element, any material having suitable piezoelectric properties to provide Z positioning of the self-actuated cantilever 142 as described herein can be used.

Figure 8:
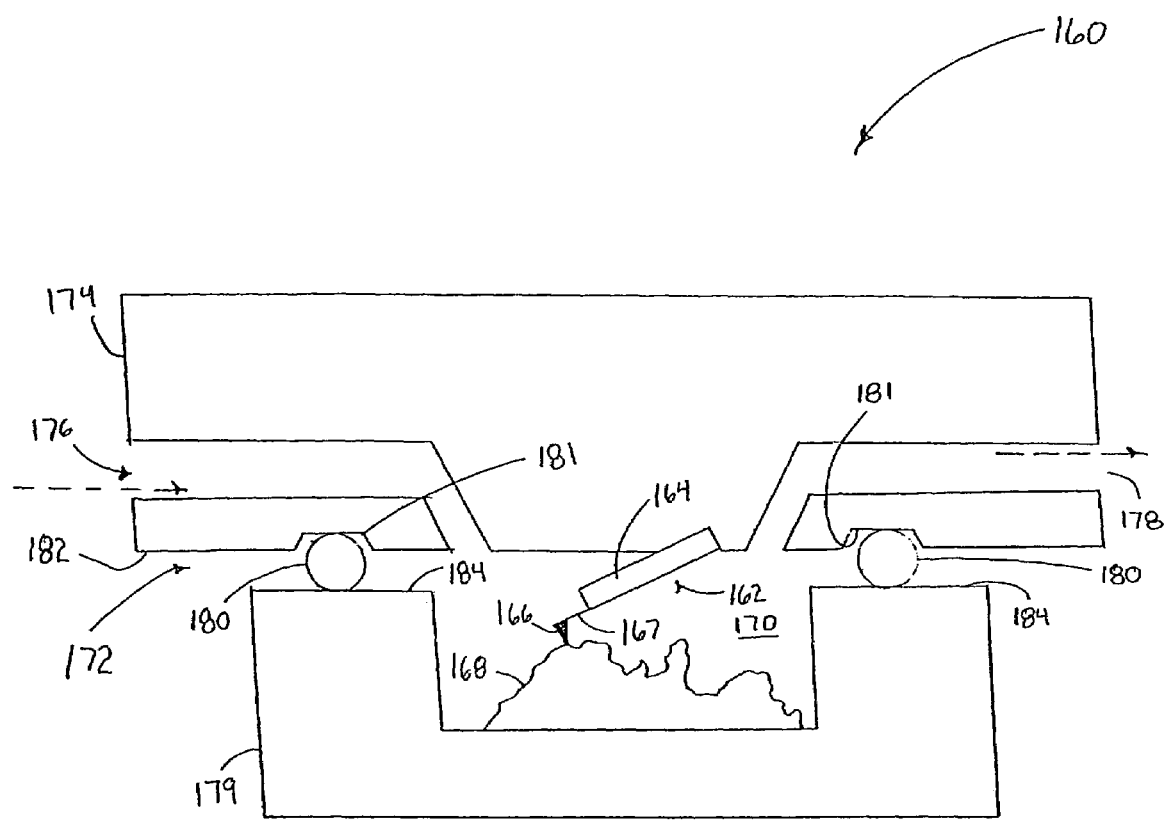
FIG. 8 is a cross-sectional elevational view of an AFM according to another embodiment of the present invention, adapted for fluid operation.

Next, with reference to FIG. 8, an AFM 160 particularly adapted for imaging the surfaces of biological substances is shown. AFM 160 includes a piezoelectric self-actuated cantilever 162 having a piezoelectric element 164 disposed thereon and a tip 166 that interacts with a sample 168. The sample 168 is generally immersed in a pool of fluid 170 contained by a fluid cell 172. Some advantages with such a system include elimination of capillary forces and the reduction of Van der Waals forces, particularly when analyzing and imaging biological samples.

In this embodiment, the integrated high-speed actuator of cantilever 162 replaces a conventional (e.g., piezo-stack) tip/sample actuator used by a typical biological AFM, thus enhancing the bandwidth of the mechanical system, as described previously. Fluid cell 172 is formed, in part, using an AFM mount 174 having ports 176, 178 for inputting and dispensing fluid 170, respectively. Mount 174 also serves as a support to which a fixed end of cantilever 162 is attached. A stage 179 is configured to accommodate sample 168 and comprises 1) a top surface 184 that defines a portion of fluid cell 172 and 2) a cavity that receives the fluid 170 and the sample 168. O-rings 180 are disposed between a notched portion 181 of a bottom surface 182 of mount 174 and the top surface 184 of stage 179 to seal fluid cell 172 from the surrounding environment. Also, the piezoelectric (e.g., ZnO) element 164 is micromachined and therefore very small and very fast. For example, the resonance of a ZnO cantilever is approximately one hundred times greater than the resonance of a bulk piezo-tube actuator. For a given operational condition in the so-called contact mode, any increase in actuator resonant frequency will increase data acquisition/imaging speed in the same proportion.

As noted above, the Q of the cantilever resonance is damped by the viscous environment in which this embodiment of the invention operates, thus lessening the bandwidth limitations caused by a large Q (discussed above). Nevertheless, these speed advantages are countered by the increased drive oscillation required to operate the damped cantilever.

In operation, the resonant nature of the cantilever 162 stores the excitation energy and amplifies the movement of the tip 166. The quality factor (Q) is representative of this resonant amplification and is dependent on the damping in the resonant system. In fluid, where viscous forces are much greater than in air, the Q can drop significantly. With this limitation on resonant amplification, the system must excite the cantilever 162 almost the same amount as the desired tip amplitude in order to drive the cantilever at its resonance. For known systems which excite the cantilever resonance with a piezotube or piezo-stack actuator located beneath the cantilever die, the entire piezo-stack and cantilever die are moving distances commensurate with the tip movement. Driving the cantilever in this fashion excites resonance's in fluid cell 172, e.g., due to acoustic excitation, thus disrupting imaging capabilities. One preferred embodiment of the present invention substantially subverts this problem by using the piezoelectric element 164 of cantilever 162 to excite the cantilever beam. This construction integrates the entire oscillating excitation onto the AFM cantilever 162 and, therefore, virtually eliminates the acoustic excitation of the fluid cell 172.

During operation in fluid, in contrast to the previously described embodiments, the electrodes (not shown) coupled to the substrate of self-actuated cantilever 162 will potentially interface with fluid 170. This fluid/electrode interaction exposes the electrical system of AFM 160 to a high risk of short. Therefore, the electrodes should be passivated, e.g., insulated from fluid 170. Preferably, an insulating layer 167 is deposited generally over the entire cantilever structure, usually as a final step in the fabrication of cantilever 162. Depending upon the process employed, the insulating layer 167 can be removed from the apex of tip 166. Preferably because the design and composition of the tip 166 affects imaging resolution, whatever the passivation process, care should be taken to ensure that the insulating layer 167 does not cover the apex of the tip 166 to optimize imaging resolution.

Insulators usable as layer 167 include silicon nitride, silicon dioxide, and polymers including PMMA, photoresist, RTV of any viscosity and polyimide. During cantilever fabrication, nitride and oxide may be deposited on cantilever 162, preferably by either chemical vapor deposition (CVD), low pressure CVD or plasma enhanced CVD. Alternatively, sputtering or evaporation techniques may be used to deposit such insulators. On the other hand, polymers preferably are deposited by spin coating or vapor phase deposition.

Another equally viable passivation technique is "shadow masking" the apex of tip 166 and spraying-on one of various polymers including PMMA, dissolved TEFLON®, photoresist, or PDMS (polydimethylsiloxane elastomer). The sprayer used in such a process can be, for example, a commercial air-brush, and the shadow mask can be a micropipette or a pulled pipette. Alternatively, cantilever 162 can be passivated by dipping the entire probe, except for the tip 166, into PMMA, photoresist, TEFLON® or PDMS, and then allowing the device to cure. Notably, the two methods described immediately above are best performed once the cantilever 162 is mounted onto a robust substrate. Further, the wire bonds (not shown) which connect the cantilever die to the substrate, and all other contacts to outside leads are preferably coated with an insulator such as Dow Corning 3140RTV.

The process for depositing the insulating layer 167 must be compatible with the specialized process for forming the integrated piezoelectric actuator of cantilever 162. In particular, the insulating layer should be deposited on the cantilever 162 with a controlled stress because the film typically creates a bimorph with the cantilever which can cause unwanted curvature in the device. In fact, if this stress is not controlled, the stress could potentially "rip" the cantilever 162 from its base. There are a variety of conventional methods to control the stress when passivating the cantilever with either a deposited film or a polymer film. For deposited films, temperature, gas ratios, pressures, power (when utilizing plasma deposition), etc. are appropriately varied to control the final film stress. The final parameters depend on the specifications of the film and the equipment being used. Similarly, polymer film stress can be controlled by varying application temperature, rate of cure, polymer structure, etc. These parameters are altered in conventional fashion.

Figure 9:
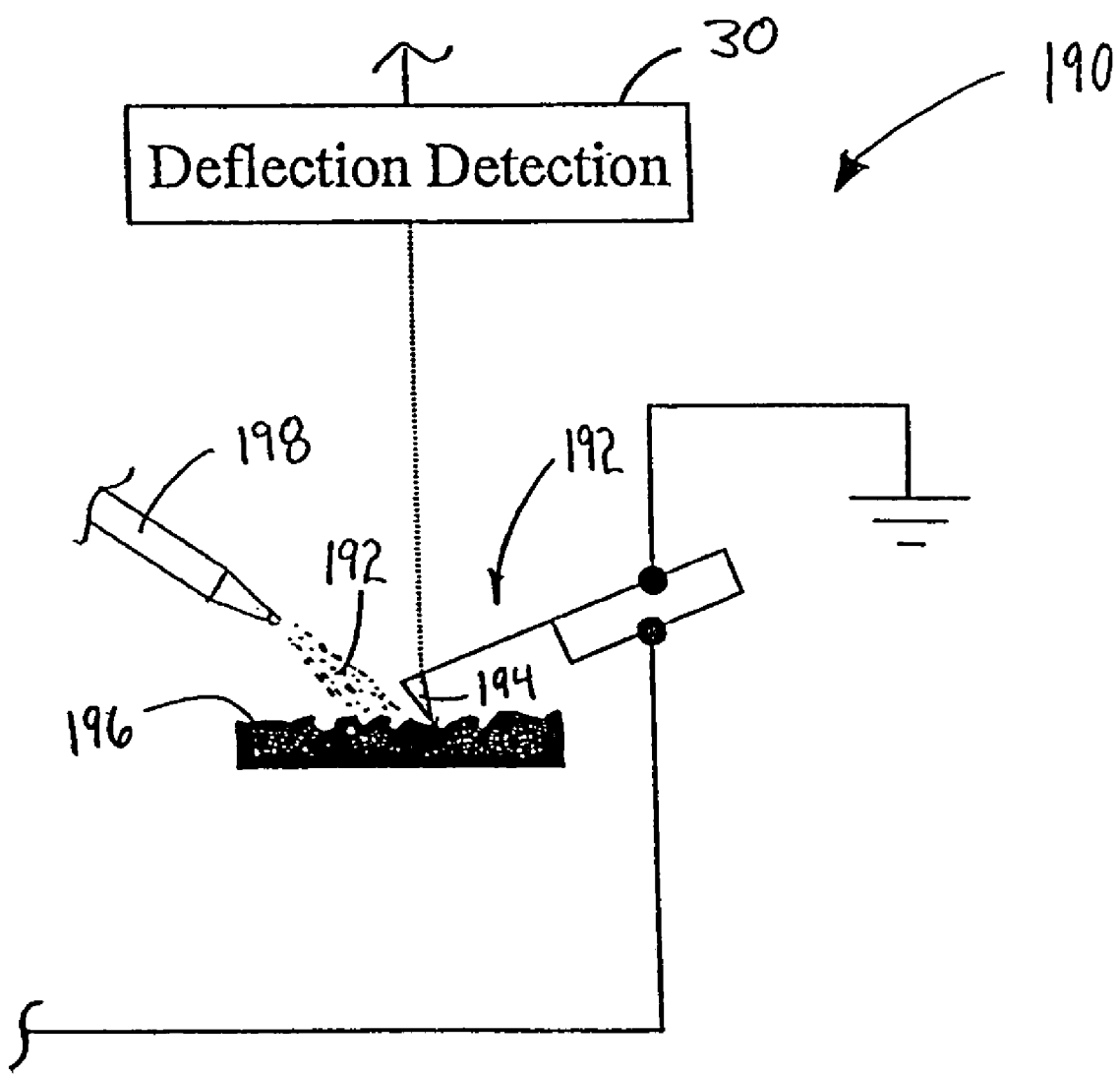
FIG. 9 is a schematic representation of another alternate embodiment of the present invention in which gasses are introduced to the sample environment.

According to another preferred embodiment, the AFMs described herein can be operated in a gaseous environment. In particular, corrosive, reactive or otherwise contaminating gases can be introduced to the AFM platform so as to perform, for example, real-time observation of chemical reactions between the gas and the sample. Similar to operation in fluid, the AFM cantilever is passivated as described above to maintain reliable cantilever operation. Without passivating the cantilever, the corrosive gasses can damage the cantilever or, at least, have a detrimental affect on cantilever operation. One method of introducing a gas includes enclosing the entire AFM in a sealed chamber 41 (FIGS. 4 and 6) and introducing the gas within the chamber. Alternatively, as shown in FIG. 9, gasses can be supplied to an AFM 190 via unconstrained blowing of a compressed gas from a nozzle 198 towards sample 196. Yet another alternative is to use a fluid cell, such as that shown in FIG. 8 and described above, except a gas is introduced at inlet 176 rather than a liquid. According to this latter alternative, the chemical reaction is isolated within the fluid cell, which may be required for some applications.

Figure 10:
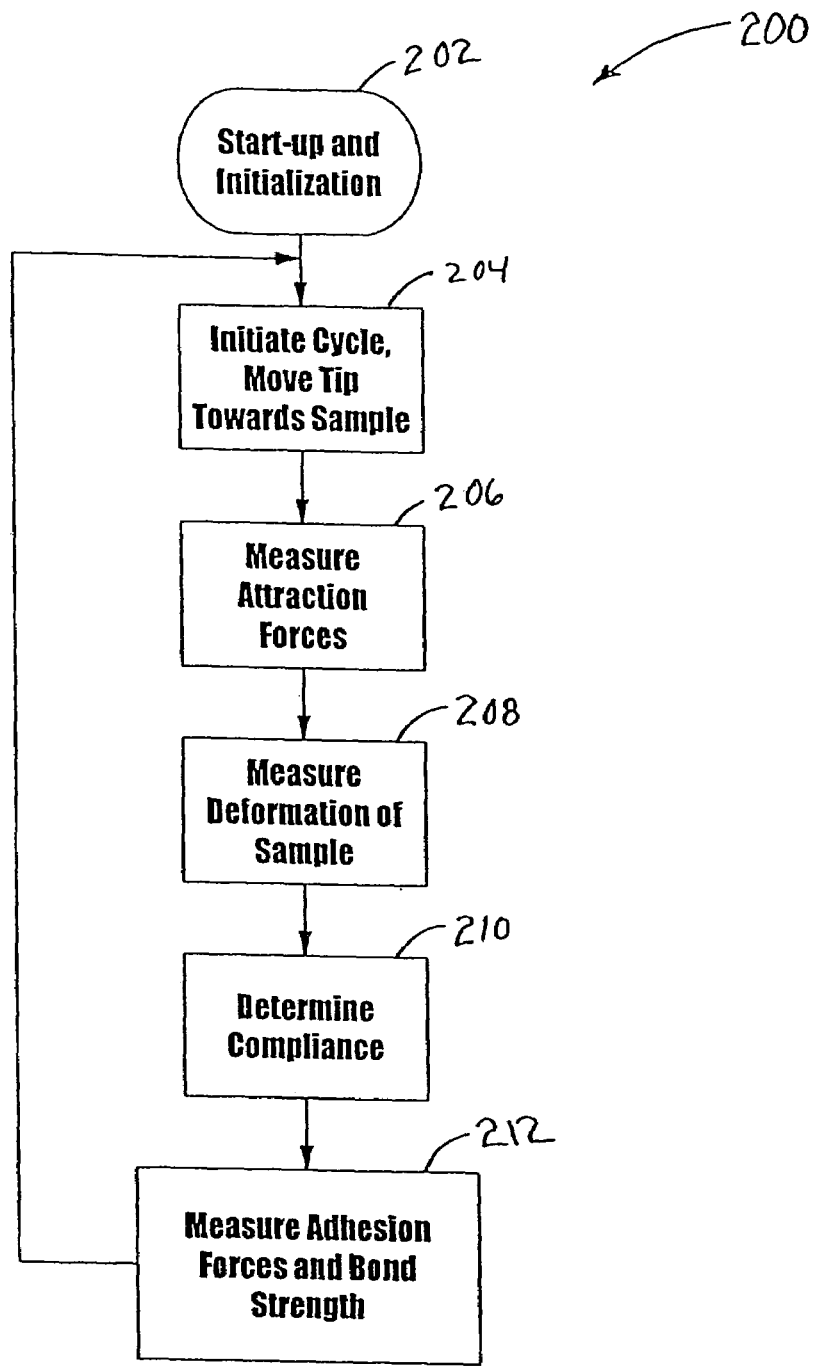
FIG. 10 is a flow diagram illustrating AFM operation when making single pixel measurements.

Although the preferred embodiments have been generally described as apparatus and methods for imaging the surface of a sample, the techniques described herein can be implemented for single pixel measurements. Rather than imaging, i.e., acquiring and conditioning data from a scan line or a scan area containing many pixels, the AFM is operated to obtain data pertaining to a single pixel or point associated with the sample. In particular, the tip is oscillated perpendicularly to the sample, as various measurements are made throughout each oscillation cycle. More particularly, turning to FIG. 10, a method 200 of collecting data for a single pixel measurement includes, after initialization and start-up at Step 202, beginning a data acquisition cycle to cause the tip to move toward the sample at Step 204. As the tip approaches the sample, tip-sample interaction is monitored. In particular, at Step 206, the attraction forces between the tip and sample are measured and stored for further analysis. Then, during a second part of the cycle, the tip contacts the sample surface and, at Step 208, the degree to which the sample "deforms" is measured. At Step 210, the system determines the compliance of the sample under test and stores the data. Finally, at Step 212, a third part of the cycle causes the tip to pull away from the sample, and adhesion forces are measured and bond strength is determined. The method 200 then returns operation of the system back to Step 204 to collect data for additional cycles relating to the same or another pixel. Overall, the measurements made during one (or more) cycles can be collected and processed to create a profile of the properties of the sample.

Figure 11:
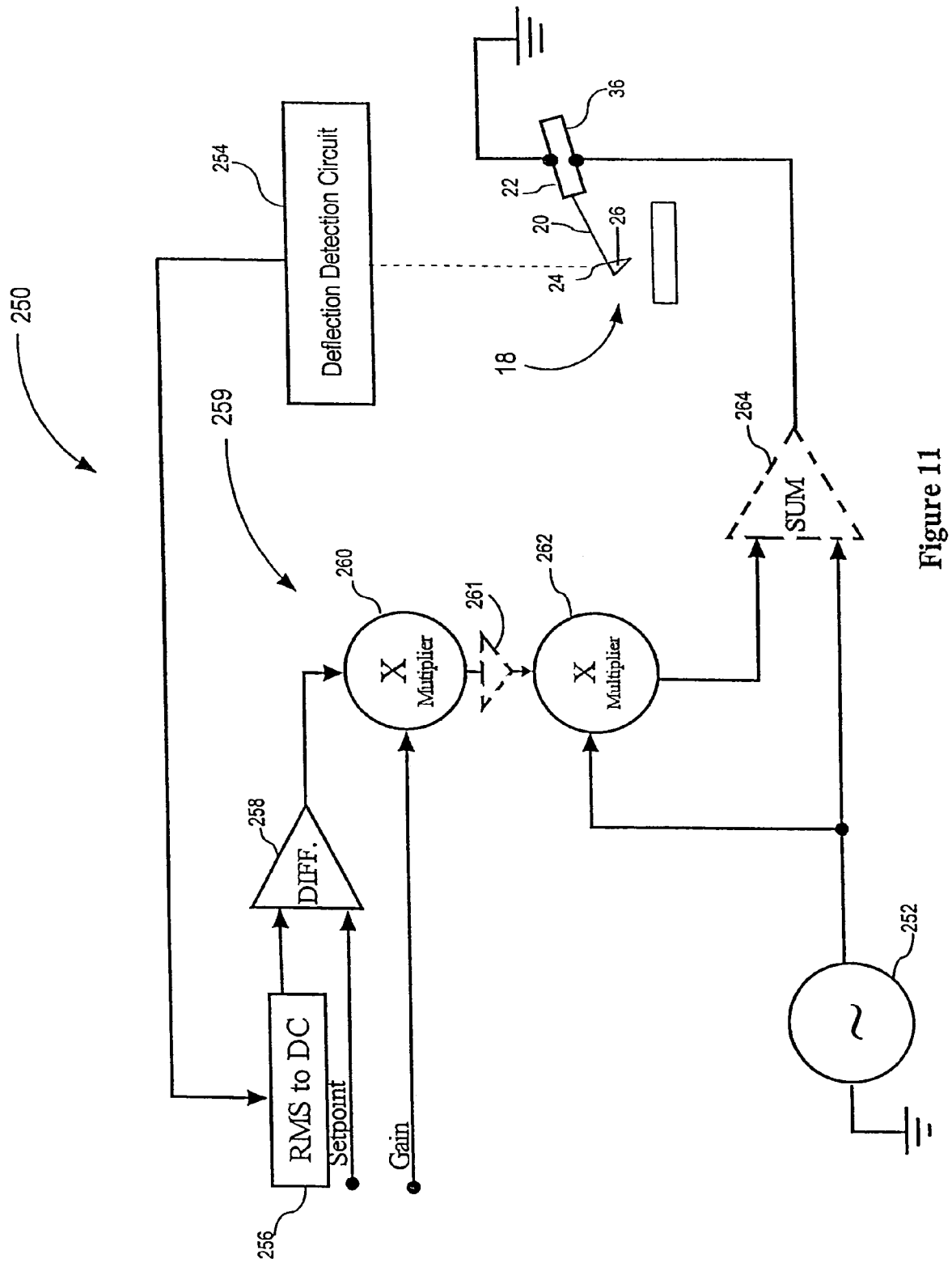
FIG. 11 is a schematic diagram illustrating an AFM according to the present invention, including an alternate embodiment of the cantilever dynamic drive circuit which modifies the Q of the cantilever as a function of the amplitude of the cantilever response.

Next, FIG. 11 shows schematically how the imaging dynamics are modified by an alternative active drive technique. Generally, an active damping feedback or active driving circuit 250 modifies the oscillating voltage output of a driving oscillator 252 (which is preferably applied directly to piezoelectric element 36 of cantilever 20) to optimize the bandwidth of amplitude detection. Cantilever driving circuit 250 utilizes a deflection detector 254 that, as described previously, is preferably an optical detection system including a laser and a photodetector, which measures cantilever deflection by an optical beam bounce technique or another conventional technique. Alternatively, as in the previously described embodiments, deflection detector 254 could be (1) a piezoresistor integrated into cantilever 20 with an associated bridge circuit for measuring the resistance of the piezoresistor, or (2) a circuit for measuring the impedance of the piezoelectric element 36 of self-actuated cantilever 20.

In operation, as it senses a deflection of cantilever 18, deflection detector 254 transmits a corresponding deflection signal to an RMS-to-DC detector 256 of active driving circuit 250. Then, the amplitude setpoint is subtracted from the RMS amplitude signal by difference amplifier 258 to generate an amplitude error signal. The amplitude error signal is then processed by an amplitude detection circuit 259. Amplitude detection circuit 259 includes a multiplier gain stage 260 adapted to scale the error signal and generate a modified amplitude signal, where a select amount of gain for the optimal amount of cantilever dynamic drive feedback is applied to the error signal. As can be appreciated by those skilled in the art of AFM operation, an operator can observe the output as the cantilever tip tracks the sample surface, and manually adjust the gain for stable operation accordingly. Alternatively, this gain selection can be automated.

Next, a multiplier 262 multiplies the scaled error signal by the output of driving oscillator 252. The output of multiplier 262 is a modulation of the scaled amplitude error signal at the cantilever drive frequency. It is subsequently summed with the normal, steady-state drive signal by summing amplifier 264 to generate a modified cantilever drive signal.

The gain applied to the error signal by multiplier 260 as it modifies the amplitude of the drive oscillator signal determines the degree to which the cantilever drive is modified in response to the sensed cantilever amplitude, and therefore is indicative of the available bandwidth. Note that the ratio of the two summed signals can be scaled at summing amplifier 264 to scale the amplitude of oscillation of cantilever 20.

Overall, by actively modifying the cantilever drive signal as described above, active driving circuit 250 ideally optimizes the bandwidth of the response of the cantilever 20, again in the amplitude domain. As a result, the AFM can maximize scan rate, yet still maintain an acceptable degree of force detection sensitivity. This circuit configuration is preferred because of the way the cantilever drive amplitude is controlled in most commercial AFM systems. Different cantilevers will have different amplitude responses to the same drive amplitude. In a commercial AFM, the drive amplitude to the cantilever is scaled to achieve a predetermined, desirable response amplitude. In the circuit of the preferred embodiment, this amplitude scaling will also change the gain of the drive signal feedback path. As a result, the effective gain of multiplier gain stage 260 will be the same from one cantilever to the next, once the desired response amplitude has been achieved.

A gain and offset topology could also be used as a simpler circuit configuration and an alternate embodiment of amplitude detection circuit 259. In such a circuit, the output of multiplier 260 is summed with an amplitude offset signal at 261 before it is modulated at multiplier 262. Subsequently, this obviates the need for summing amplifier 264. Although this circuit has the benefit of performing the summing of the steady state and the dynamic drive amplitude in the low frequency domain, where signal processing is generally easier, it is not the most preferred embodiment because it is not readily compatible with commercial AFM designs.

Although the preferred embodiment is described with respect to analog electronics, the signal could be digitized at any point in circuit 250. The function of any circuit element of circuit 250 could be approximated by a digital signal processor once the signal has been digitized. Subsequently, the cantilever drive signal would be converted back to an analog signal before it is applied to cantilever 20.

Although the preferred embodiment describes a cantilever 20 with an integrated piezoelectric actuator 36, circuit 250 would also function with a conventional, passive cantilever mounted mechanically to a piezo-stack actuator. As mentioned previously, using a passive cantilever will not compromise AFM performance as the active damping provided by active driving circuit 250 is applied in the amplitude domain. For example, any resonance introduced in the mechanical path between the actuator (e.g., piezo-stack) and the cantilever does not affect the applied damping because the cantilever is not driven by a filtered function of its own deflection, as it is using, for example, circuit 62 shown in FIG. 3. In any event, the advantages of the self-actuated cantilever can be understood by examining FIG. 4, for example.

Figure 12:
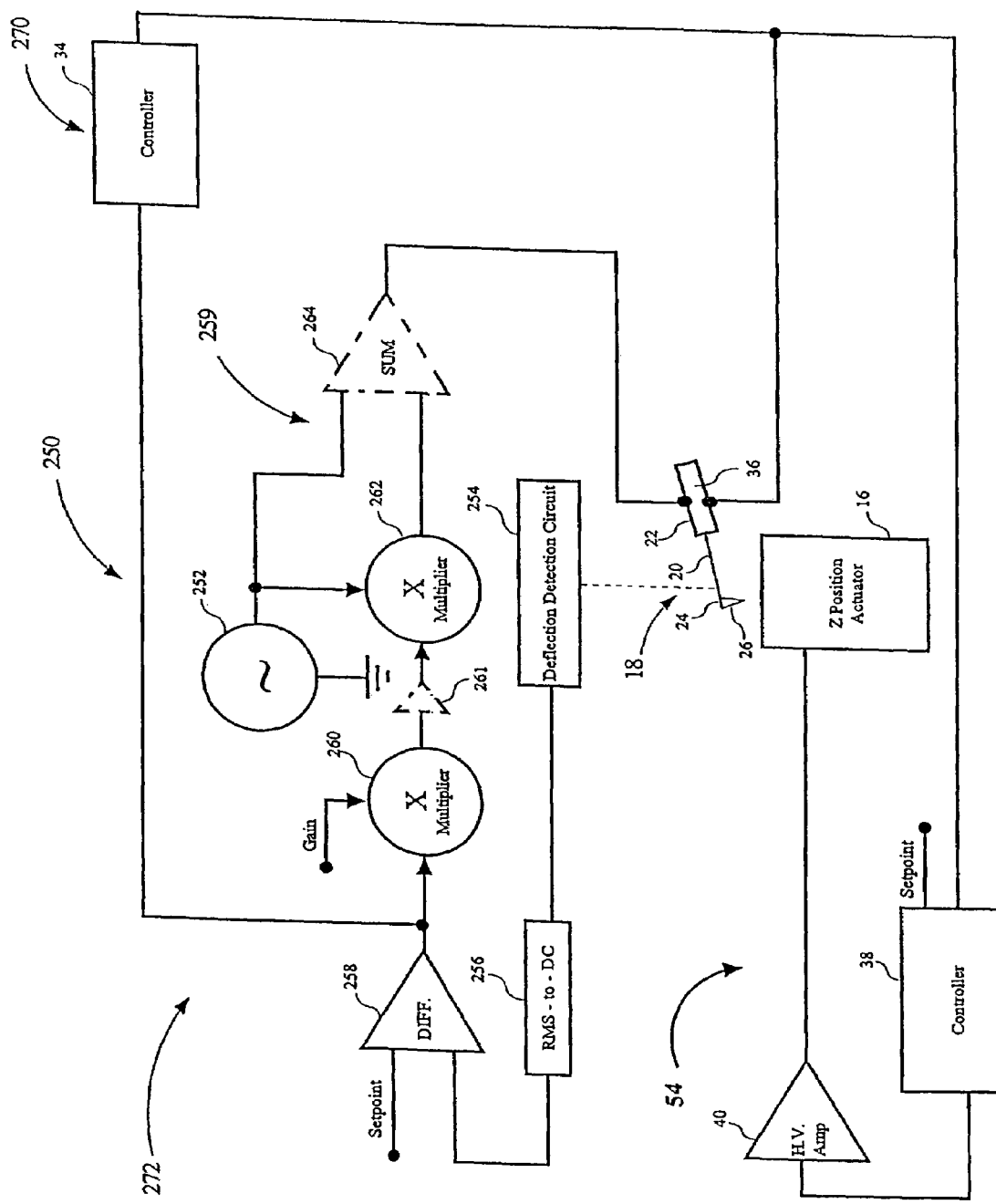
FIG. 12 is a schematic diagram illustrating an AFM according to the present invention including a cantilever and feedback circuitry to control the cantilever in cyclical mode, and a cantilever drive circuit for dynamically controlling the drive amplitude to the cantilever.

FIG. 12 shows an AFM 270 according to an alternate embodiment that incorporates the features of AFM 50 (cyclical mode configuration—FIG. 2), including two nested feedback loops 272 and 54, with the features of active driving circuit 250, including amplitude detection circuit 259 (FIG. 11). By dynamically controlling the drive of cantilever 20 with feedback signals output by circuit 250, the force detection bandwidth rises generally proportionally with a corresponding increase in gain at multiplier 260. With the control features of AFM 50 (FIG. 2), AFM 270 realizes much greater loop bandwidth in cyclical mode, thus achieving much greater (and much more commercially viable) throughput per machine.

In operation, active driving circuit 250 actively modifies the oscillating voltage output of a driving oscillator 252 (and applied directly to piezoelectric element 36 of cantilever 20) to optimize the bandwidth of amplitude detection. Active driving circuit 250 utilizes a deflection detector 254 that, as described with respect to FIGS. 1, 2 and 11, is preferably an optical detection system including a laser and a photodetector, and which measures cantilever deflection by an optical beam bounce technique or another conventional technique. Alternatively, as in the previously described embodiments, deflection detector 254 could be (1) a piezoresistor integrated into cantilever 20 with an associated bridge circuit for measuring the resistance of the piezoresistor, or (2) a circuit for measuring the impedance of the piezoelectric element 36 of self-actuated cantilever 20.

As it senses a deflection of cantilever 18, deflection detector 254 transmits a corresponding deflection signal to an RMS-to-DC converter 256 of active driving circuit 250. The amplitude setpoint is then subtracted from the RMS amplitude signal by difference amplifier 258 to generate an amplitude error signal, as described previously. The amplitude error signal is then communicated to amplitude detection circuit 259 where it is scaled by multiplier gain stage 260. A select amount of gain for the optimal amount of cantilever dynamic-drive feedback is applied to the error signal. Typically, a skilled AFM operator adjusts the gain to achieve optimum performance. The scaled error signal is then fed to second multiplier 262 that multiples the scaled error signal by the output of a driving oscillator 252. Note that the output of multiplier 262 is a modulation of the scaled amplitude error signal at the cantilever drive frequency. It is subsequently summed with the normal, steady-state drive signal output by oscillator 252 by summing amplifier 264 to generate a modified cantilever drive signal.

Again, the gain applied to the error signal by multiplier 260 as it modifies the amplitude of the drive oscillator signal determines the degree to which the cantilever drive is modified in response to the sensed cantilever amplitude, and therefore is indicative of the available bandwidth. Note that the ratio of the two summed signals can be scaled at summing amplifier 68 to scale the amplitude of oscillation of cantilever 20.

When the tip 26 is in close proximity to sample surface 28, the force interaction between tip 26 and sample surface 28 modifies the amplitude of vibration in cantilever 20. The deflection signal generated by the deflection detector 254 in response to a detected change in the amplitude of vibration is then converted to an RMS amplitude signal by RMS-to-DC converter 256 to facilitate further processing. Notably, any known amplitude detection technique may be used in place of RMS-to-DC converter 256.

Similar to AFM 50, the operating RMS amplitude of the cantilever vibration is determined (at least in part) by the setpoint value, which is subtracted from the cantilever deflection signal by difference amplifier 258. The error signal generated by difference amplifier 258 is input to controller 34. Controller 258 applies one or more of proportional, integral and differential gain to the error signal and controls piezoelectric element 36 of self-actuated cantilever 20 to null the error signal, thus ensuring that the amplitude of cantilever oscillation is kept generally constant at a value equal to the setpoint. A high voltage amplifier (not shown) may be employed to increase the voltage of the signal to cantilever 20, but is not required.

The control signal transmitted by controller 34 to cantilever 20 is also input to controller 38 of second feedback loop 54 such that first feedback loop 272 is nested within second feedback loop 54. Preferably, the second setpoint input to controller 38 is a zero value associated with AFM actuator 16, in which case the cantilever control signal is itself the error signal conditioned by controller 38. Again, PID controller 38 applies one or more of proportional, integral and differential gain to the error signal for ultimately controlling Z position actuator 16 to null the low frequency components of the control signal applied to the self-actuated cantilever, when scanning at an optimum rate. Further, as highlighted above, a high voltage amplifier 40 may be employed to increase the voltage of the control signal applied to Z position actuator 16, and is required for most position transducers of the scale contemplated by the present invention.

In sum, AFM 270 combines an AFM Z actuator 16 with a self-actuated cantilever 20 in a manner that allows both high speed imaging and accurate Z position measurement.

By actively modifying the cantilever drive signal as described above, active driving circuit 250 ideally optimizes the bandwidth of the response of the cantilever 20. As a result, the AFM can maximize scan rate, yet still maintain an acceptable degree of force detection sensitivity. Further, depending upon the particular sample topography and the scan rate, the topography can be mapped by monitoring one of the feedback control signals independent of the other.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A method of analyzing a sample in cyclical mode with a probe-based AFM, the method comprising:
    providing a cantilever;
    oscillating the cantilever at an amplitude of oscillation so as to cause a tip of the cantilever to intermittently contact a surface of the sample;
    scanning the cantilever across the sample;
    generating a deflection signal in response to said scanning step;
    demodulating said deflection signal to generate an amplitude signal indicative of the amplitude of oscillation of the cantilever;
    generating, with a first feedback loop, a first control signal in response to the amplitude signal;
    using the first control signal as an error signal in a second feedback loop, wherein the first feedback loop is nested within the second feedback loop; and
    damping the oscillating voltage with an active drive circuit to actively modify the quality factor (Q) of the cantilever resonant frequency during said scanning step.

2. The method of claim 1, wherein said demodulating step includes using an amplitude detection circuit.

3. The method according to claim 2, wherein the amplitude detection circuit includes a gain stage.

4. The method according to claim 1, further comprising the steps of:
    providing a first actuator and a second actuator;
    controlling the motion of the first actuator with the first control signal generated by the first feedback loop to keep the amplitude signal substantially constant;
    generating with the second feedback loop a second control signal; and
    controlling the motion of the second actuator with the second control signal to keep the first control signal substantially constant.

* * * * *